(12) United States Patent
Al Majid et al.

(10) Patent No.: US 11,169,658 B2
(45) Date of Patent: Nov. 9, 2021

(54) COMBINED MAP ICON WITH ACTION INDICATOR

(71) Applicant: Snap Inc., Santa Monica, CA (US)

(72) Inventors: Newar Husam Al Majid, Santa Monica, CA (US); Laurent Desserrey, Los Angeles, CA (US); Donald Giovannini, Venice, CA (US); Daniel Rakhamimov, Brooklyn, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/826,903

(22) Filed: Mar. 23, 2020

(65) Prior Publication Data

US 2021/0200425 A1    Jul. 1, 2021

Related U.S. Application Data

(60) Provisional application No. 62/955,754, filed on Dec. 31, 2019.

(51) Int. Cl.
| | | |
|---|---|---|
| *G06F 3/048* | (2013.01) | |
| *G06F 3/0481* | (2013.01) | |
| *G06Q 50/00* | (2012.01) | |
| *G01C 21/32* | (2006.01) | |
| *H04W 4/029* | (2018.01) | |

(Continued)

(52) U.S. Cl.
CPC ......... *G06F 3/04817* (2013.01); *G01C 21/32* (2013.01); *G06F 3/04815* (2013.01); *G06Q 50/01* (2013.01); *H04M 1/72427* (2021.01); *H04M 1/72457* (2021.01); *H04M 1/72469* (2021.01); *H04W 4/029* (2018.02)

(58) Field of Classification Search
CPC ............................ G06F 3/04817; G06F 16/29
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

U.S. Appl. No. 16/836,797, filed Mar. 31, 2020, Expressive User Icons in a Map-Based Messaging System Interface.

(Continued)

*Primary Examiner* — Claudia Dragoescu
(74) *Attorney, Agent, or Firm* — Schwegman Lundberg & Woessner, P.A.

(57) ABSTRACT

Systems, devices, methods, and instructions are described for generating and using expressive icons with status indicators for a map based graphical user interface (GUI). One embodiment involves accessing location information, map data icon information, and action indicator information associated with an account of a social media platform. A device then causes generation of a combined action icon generated using the icon information and the action indicator and causes display of a map interface with the map data and the combined action icon positioned at a location indicated by the location information.

20 Claims, 19 Drawing Sheets

(51) Int. Cl.
*H04M 1/72427* (2021.01)
*H04M 1/72457* (2021.01)
*H04M 1/72469* (2021.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,002,384 B1 * | 4/2015 | Hallenbeck ........ G06Q 30/0201 455/457 |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0020661 A1 | 9/2005 | Cordelli |
| 2006/0294465 A1 | 12/2006 | Ronen et al. |
| 2007/0098342 A1 | 5/2007 | Temple et al. |
| 2007/0113131 A1 | 5/2007 | Blattner et al. |
| 2007/0168863 A1 | 7/2007 | Blattner et al. |
| 2007/0176921 A1 | 8/2007 | Iwasaki et al. |
| 2007/0204218 A1 | 8/2007 | Weber et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0009378 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0265023 A1 * | 10/2011 | Loomis ............... G06F 3/04812 715/771 |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0290978 A1 | 11/2012 | Devecka |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0092130 A1 * | 4/2014 | Anderson ......... H04M 1/72569 345/632 |
| 2014/0095073 A1 | 4/2014 | Matas et al. |
| 2014/0125678 A1 | 5/2014 | Wang et al. |
| 2014/0129343 A1 | 5/2014 | Finster et al. |

(56) References Cited

U.S. PATENT DOCUMENTS

| | | | |
|---|---|---|---|
| 2015/0185030 A1* | 7/2015 | Monroe | G01C 21/20 |
| | | | 701/532 |
| 2015/0206349 A1 | 7/2015 | Rosenthal et al. | |
| 2015/0245168 A1* | 8/2015 | Martin | G06Q 50/01 |
| | | | 715/751 |
| 2016/0134840 A1 | 5/2016 | Mcculloch | |
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0098342 A1 | 4/2017 | Alon | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Dusen et al. | |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2018/0350144 A1 | 12/2018 | Rathod | |
| 2019/0001223 A1 | 1/2019 | Blackstock et al. | |
| 2019/0057616 A1 | 2/2019 | Cohen et al. | |
| 2019/0087468 A1* | 3/2019 | Agarwal | G06F 16/435 |
| 2019/0188920 A1 | 6/2019 | Mcphee et al. | |
| 2019/0282903 A1 | 9/2019 | Brody et al. | |
| 2021/0200426 A1 | 7/2021 | Al Majid et al. | |

FOREIGN PATENT DOCUMENTS

| | | | |
|---|---|---|---|
| EP | 2184092 | A2 | 5/2010 |
| JP | 2001230801 | A | 8/2001 |
| JP | 5497931 | B2 | 3/2014 |
| JP | 2014146357 | A | 8/2014 |
| KR | 101445263 | B1 | 9/2014 |
| KR | 20190073032 | A | 6/2019 |
| WO | WO-2003094072 | A1 | 11/2003 |
| WO | WO-2004095308 | A1 | 11/2004 |
| WO | WO-2006107182 | A1 | 10/2006 |
| WO | WO-2007134402 | A1 | 11/2007 |
| WO | WO-2012139276 | A1 | 10/2012 |
| WO | WO-2013027893 | A1 | 2/2013 |
| WO | WO-2013152454 | A1 | 10/2013 |
| WO | WO-2013166588 | A1 | 11/2013 |
| WO | WO-2014031899 | A1 | 2/2014 |
| WO | WO-2014194439 | A1 | 12/2014 |
| WO | WO-2016090605 | A1 | 6/2016 |
| WO | WO-2018081013 | A1 | 5/2018 |
| WO | WO-2018102562 | A1 | 6/2018 |
| WO | WO-2018129531 | A1 | 7/2018 |
| WO | WO-2019089613 | A1 | 5/2019 |
| WO | 2021133960 | | 7/2021 |

OTHER PUBLICATIONS

"U.S. Appl. No. 16/836,797, Final Office Action dated Jun. 4, 2021", 20 pgs.

"U.S. Appl. No. 16/836,797, Non Final Office Action dated Dec. 1, 2020", 16 pgs.

"U.S. Appl. No. 16/836,797, Response filed Apr. 1, 2021 to Non Final Office Action dated Dec. 1, 2020", 13 pgs.

"International Application Serial No. PCT/US2020/066920, International Search Report dated May 6, 2021", 3 pgs.

"International Application Serial No. PCT/US2020/066920, Written Opinion dated May 6, 2021", 4 pgs.

* cited by examiner

COMBINED MAP ICON WITH ACTION INDICATOR

PRIORITY

This application claims the benefit of priority to U.S. Provisional Patent application Ser. No. 62/955,754 filed Dec. 31, 2019, which is incorporated by reference herein in its entirety.

TECHNICAL FIELD

Embodiments of the present disclosure relate generally to social media applications. More particularly, but not by way of limitation, the present disclosure addresses systems and methods for generating and updating a map-based graphical user interface for a social media application.

BACKGROUND

Social media applications implement computer-mediated technologies allowing for the creating and sharing of content that communicates information, ideas, career interests, and other forms of expression via virtual communities and networks. Social media platforms use web-based technologies, desktop computers, and mobile technologies (e.g., smart phones and tablet computers) to create highly interactive platforms through which individuals, communities, and organizations can share, co-create, discuss, and modify user-generated content or pre-made content posted online.

Mobile electronic devices on which end-user social media applications can be executed typically provide geolocation services that determine the geographic location of the mobile electronic device, by extension indicating the geographic location of the associated user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
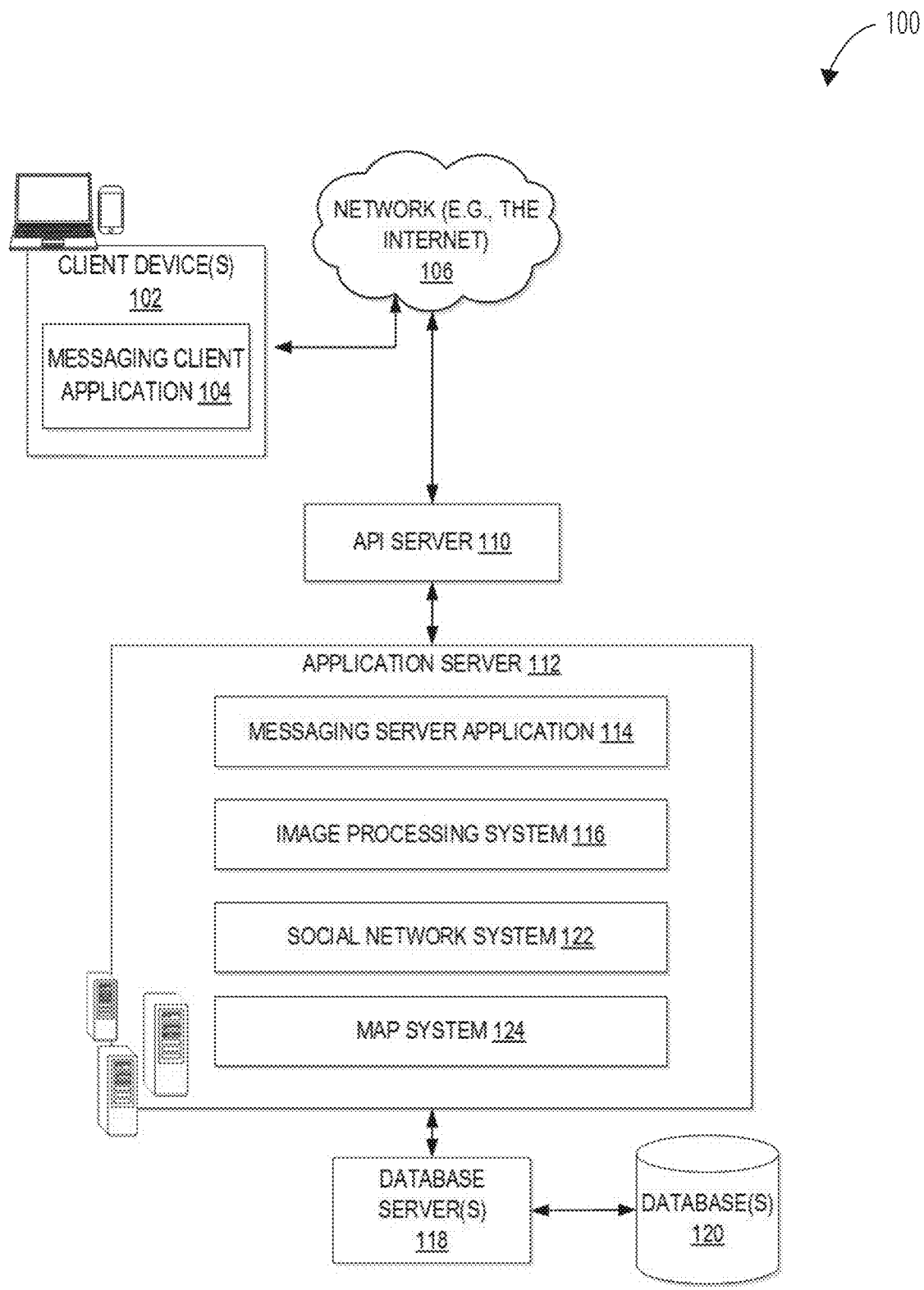
FIG. 1 is a block diagram showing an example social media platform system in accordance with some embodiments.

Embodiments described herein related to geographical map-based graphical user interfaces (GUIs). Some embodiments particularly describe a map GUI for a social media platform or application, to allow user access to map-based location information with expressive icons having status indicators for users. Various systems, methods, instructions, and user interface details are described for generating such expressive icons with status indicators and presenting them in a map-based GUI.

For example, in some embodiments a social networking system is authorized by users and user selectable settings to track locations of user devices, and to share this information with other users. A map GUI with information on device locations can be presented to a user on a display of the user's client device. An expressive icon with a particular user's features is one way to present complex information quickly via a map, but such an expressive icon can be limited in the detail of the information provided.

Addition of a status indicator to such an expressive icon (e.g. a user representation for a user associated with an account) can enable communication of significantly more information via the combination of the expressive icon with a status indicator. Additionally, the status indicator can be used with the expressive icon to generate a combined expressive icon. In some embodiments, such a combined expressive icon is used to communicate complex information quickly via a map-based GUI, while in other embodiments, direct actions particularly associated with a status indicator can be enabled with a combined expressive icon. This can, for example, enable a combined icon with a tailored action, such as a sleep status indicator in an icon used to automatically initiate a communication with a do-not-disturb element (e.g. communicating after a sleep period is expected to end), or an activity indicator in an icon automatically initiating directions to the activity in a map interface. In such a system that displays icon's for device locations, information communicated in a map interface can be significantly expanded, and user interface actions tailored to associated status indicators and activities can be reduced by linking actions available to the status indicated by a combined map icon.

In some examples, addition of action oriented information (e.g., action indicator information) can be used with the expressive icon to generate a combined expressive icon. For example, a combined expressive icon can be used to communicate a present or future desire to participate in a specific activity. In some examples, the combined expressive icon can be used to communicate a present or future desire to travel to a subsequent location.

Embodiments described herein improve the operation of a client device presenting a map-based GUI by increasing the information density presented in the GUI, as well as by providing tailored interfaces directly in the map interface, with the action associated with a map icon tailored to a action indicator used for a combined icon. By allowing different icons to have different associated actions, while allowing the icon to present the relevant complex information by combining an expressive user representation (e.g. icon) with action indicator data, a user can perform actions with fewer inputs and a lower time to achieve the same results with a device.

Such a map GUI can include combined icons for many different user accounts, with each icon representing approximate respective positions of a user's friends or devices for connected accounts in a social network graph. The complex expressive icon and action indicator information described above can be displayed for each, with a customized action interface for each icon based on the action indicator for each icon. Thus, the map GUI can in some embodiments enable the user to interface in complex ways with social media content and other users within a system.

FIG. 1 is a block diagram showing an example social media platform system 100 for exchanging data (e.g., social media items or messages and associated content) over a network. In this description, items communicated from one user to one or more other users via a social media application or platform, as well as items uploaded or provided by users to a social media application or platform for availability to or consumption by other users via the social media application or platform, are referred to as "messages." Thus, the term "messages" as used herein is not limited to communications from one user to specified recipient users, but includes messages made available for public consumption via the relevant social media platform.

The social media platform system 100 includes multiple client devices 102, each of which hosts a number of applications including a social media client application 104. Each social media client application 104 is communicatively coupled to other instances of the social media client application 104 and a social media application server system 108 via a network 106 (e.g., the Internet).

Accordingly, each social media client application 104 is able to communicate and exchange data with another social media client application 104 and with the social media application server system 108 via the network 106. The data exchanged between social media client applications 104, and between a social media client application 104 and the social media application server system 108, includes functions (e.g., commands to invoke functions) as well as payload data (e.g., text, audio, video, or other multimedia data).

The social media application server system 108 provides server-side functionality via the network 106 to a particular social media client application 104. While certain functions of the social media platform system 100 are described herein as being performed by either a social media client application 104 or by the social media application server system 108, it will be appreciated that the location of certain functionality either within the social media client application 104 or the social media application server system 108 is a design choice. For example, it may be technically expedient to initially deploy certain technology and functionality within the social media application server system 108, but to later migrate this technology and functionality to the social media client application 104 where a client device 102 has a sufficient processing capacity.

The social media application server system 108 supports various services and operations that are provided to the social media client application 104. Such operations include transmitting data to, receiving data from, and processing data generated by the social media client application 104. This data may include message content, client device information, geolocation information, media annotations and overlays, message content persistence conditions, social network information, and live event information, as examples. Data exchanges within the social media platform system 100 are invoked and controlled through functions available via user interfaces (UIs) of the social media client application 104.

Turning now specifically to the social media application server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the social media client application 104 in order to invoke functionality of the application server 112. The API server 110 exposes various functions supported by the application server 112, including account registration; login functionality; the sending of messages, via the application server 112, from a particular social media client application 104 to another social media client application 104; the sending of media files (e.g., images or video) from a social media client application 104 to a social media server application 114, for possible access by another social media client application 104; the setting of a collection of media data (e.g., a story or gallery); the retrieval of such collections; the retrieval of a list of friends of a user of a client device 102; the retrieval of messages and content; the adding and deletion of friends to and from a social graph; the location of friends within a social graph; opening an application event (e.g., relating to the social media client application 104); and so forth.

The application server 112 hosts a number of applications and subsystems, including the social media server application 114, an image processing system 116, a social network system 122, and a map system. The social media server application 114 implements a number of message processing technologies and functions, particularly related to the aggregation and other processing of content (e.g., textual and multimedia content) included in messages received from multiple instances of the social media client application 104. As will be described in further detail, the text and media content from multiple sources may be aggregated into collections of content (e.g., called "stories" or "galleries"). These collections are then made available, by the social media server application 114, to the social media client application 104. Other processor- and memory-intensive processing of data may also be performed server-side by the social media server application 114, in view of the hardware requirements for such processing.

The application server 112 also includes the image processing system 116, which is dedicated to performing various image processing operations, typically with respect to images or video received within the payload of a message at the social media server application 114.

The social network system 122 and the map system 124 support various social networking functions and services, and makes these functions and services available to the social media server application 114. To this end, the social network system 122 maintains and accesses an entity graph 304 (described below with reference to FIG. 3) within the database 120. Examples of functions and services supported by the social network system 122 include the identification of other users of the social media platform system 100 with whom a particular user has relationships or whom the particular user is "following," and also the identification of other attributes and interests of a particular user. In some embodiments, the social network system 122 includes an identification of other users whose location is available for viewing by a particular user with map system 124 via a map-based GUI displayable on a client device 102 using the corresponding social media client application 104.

Figure 2:
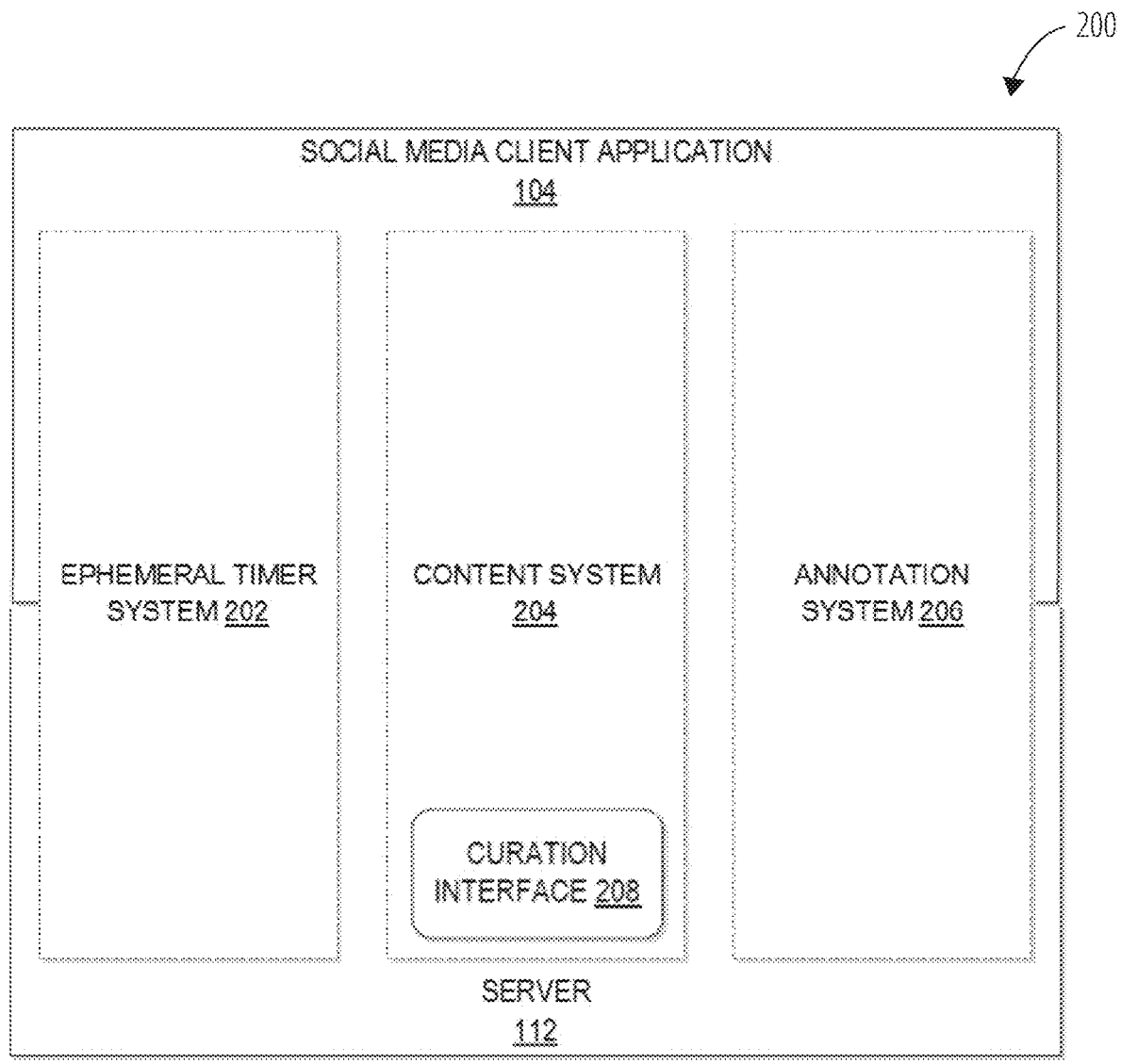
FIG. 2 is a block diagram illustrating further details regarding a social media platform system, according to example embodiments.

FIG. 2 is a block diagram illustrating further details regarding the social media platform system 100, according to example embodiments. Specifically, the social media platform system 100 is shown to comprise the social media client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the social media client application 104 and the social media server application 114. To this end, the ephemeral timer system 202 incorporates a number of timers that, based on duration and display parameters associated with a message, or collection/gallery of, selectively display and enable access to messages and associated content via the social media client application 104. Further details regarding the operation of the ephemeral timer system 202 are provided below. The messaging and ephemeral timer systems of social media client application 104 can be called as actions by customizable icons presented in a map-based GUI as described in more detail below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates, or until expiry of a last message in the gallery. For example, content relating to a music concert may be made available as a "story" for the duration of that music concert. The collection management system 204 may also be responsible for publishing an icon that provides notification of the existence of a particular collection to the user interface of the social media client application 104. As will be described in greater detail with reference to the specific example embodiments that follow, the collection management system 204 may also be responsible for compiling and managing multiple location-based social media galleries based at least in part on geo-tag data of social media items or messages uploaded to the social media platform by multiple users. Other types of galleries that may be provided by the collection management system 204 include a "place story" that collects ephemeral messages having geotag data indicating a location within a predefined associated geographical area; and an ad-hoc story or spike story that is dynamically surfaced on a map GUI as described herein based on underlying location-based social media activity, e.g., based on geo-temporal volume or anomality/unusualness of social media items submitted by users for public consumption (e.g., for inclusion in a content collection).

The collection management system 204 furthermore includes a curation interface 208 that allows a human operator (e.g., a collection manager) to manage and curate a particular collection of content. For example, the curation interface 208 enables an event organizer to curate a collection of content relating to a specific event (e.g., to delete inappropriate content or redundant messages). Instead, or in addition, the collection management system 204 may employ machine vision (or image recognition technology), geotag data, and/or content rules to automatically compile and/or curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise augment, modify, or edit media content associated with a message. For example, the annotation system 206 provides functions related to the generation and publishing of media overlays for messages processed by the social media platform system 100. The annotation system 206 operatively supplies a media overlay to the social media client application 104 based on a geolocation of the client device 102. In another example, the annotation system 206 operatively supplies a media overlay to the social media client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph taken by the client device 102. In another example, the media overlay includes an identification of a location overlay (e.g., Venice Beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time. Aspects of content collection and overlay viewing and management can also be called as actions from a customizable icon within a map-based GUI.

Figure 3:
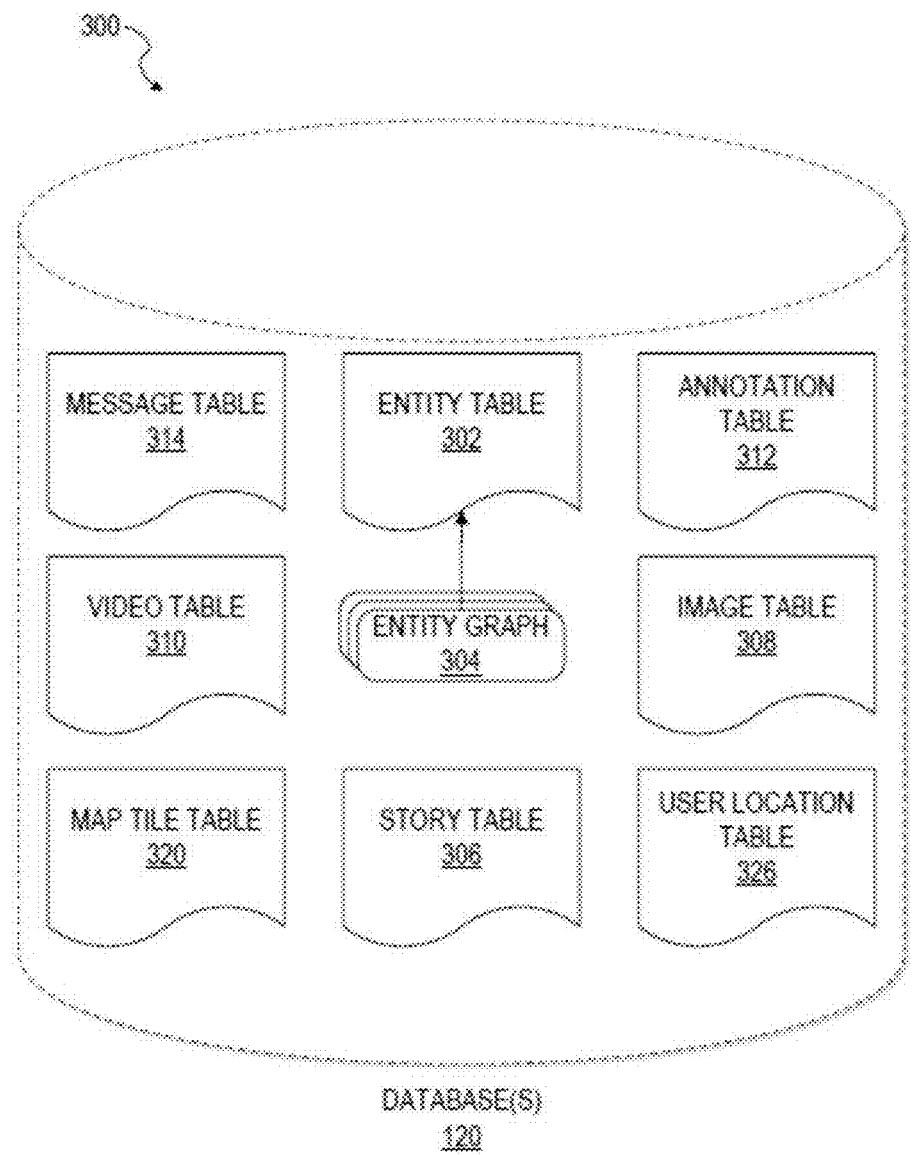
FIG. 3 is a schematic diagram illustrating data which may be stored in a database of the social media platform system, according to certain example embodiments.

FIG. 3 is a schematic diagram illustrating data 300 which may be stored in the database 120 of the social media application server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the social media application server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, including in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the social media client application 104 when the sending user is composing a message. Other types of filters include geolocation filters (also known as geo-filters), which may be presented to a sending user based on geographic location. For example, geolocation filters specific to a neighborhood or special location may be presented within a user interface by the social media client application 104, based on geolocation information determined by a Global Positioning System (GPS) unit of the client device 102. Another type of filter is a data filter, which may be selectively presented to a sending user by the social media client application 104, based on other inputs or information gathered by the client device 102 during the message creation process. Examples of data filters include a current temperature at a specific location, a current speed at which a sending user is traveling, a battery life for a client device 102, or the current time.

Yet further annotation data that may be stored within the annotation table 312 is user-generated annotations or augmentations provided by the user to overlay an underlying photographic image or video. Such augmentations/annotations can include, for example, text annotations and drawing annotations or augmentations provided by the user (e.g., via a client device touchscreen).

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a content story or a gallery). The creation of a particular collection may be initiated by a particular user (e.g., any user for whom a record is maintained in the entity table 302). A user may create a "personal story" in the form of a collection of content that has been created and sent/broadcast by that user. To this end, the user interface of the social media client application 104 may include an icon that is user selectable to enable a sending user to add specific content to his or her personal story. In the context of this description, such messages and stories/galleries are understood to be for private consumption, being limited for viewing via the social media application to particular users identified by the submitting user or to users who are members of a social network of the submitting user. This is to be contrasted with social media items provided for public or non-private consumption via the social media application, not being limited to a user-specific or user-specified subset of all users of the social media application.

As mentioned, a collection may also constitute a "Live Story," which is a collection of content from multiple users that is created manually, automatically, or using a combination of manual and automatic techniques. For example, a "Live Story" may constitute a curated stream of user-submitted content from various locations and events. Users whose client devices have location services enabled and are at a common event location at a particular time may, for example, be presented with an option, via a user interface of the social media client application 104, to contribute content to a particular live story. The live story may be identified to the user by the social media client application 104, based on his or her location. The end result is a "live story" told from a community perspective. In accordance with some example embodiments of this disclosure, a submitting user can submit social media items or messages to a non-specific common live story. Such content is accessible to other users via a map-based graphical user interface, with such social media items or messages being accessible via the map GUI based on a respective location indicated by corresponding geo-tag data, either by forming part of a location-based gallery or story, or by such other users using location-based search mechanisms forming part of the map GUI.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus). In some embodiments of this disclosure, a message uploaded to a content collection generally, without the user specifying a particular location story in which the message is to be included, can automatically or semi-automatically be included in a location story based at least in part on geo-tag data of the message.

A map tile table 320 stores multiple map tiles that can be used for presenting a map in a map viewport of a map-based GUI, according to some embodiments of this disclosure. In a particular example embodiment, each map view is composed of 9 or 16 map tiles stitched together. A plurality of sets of map tiles may be maintained for different map zoom levels. In some example embodiments, a superset of map tiles is maintained server-side, being forwarded to a requesting client device 102 for composing a map representation of specific requested areas.

A user location table 326 stores current or most recent user location data for multiple users of the social media application. The user location data may be based on location data received from respective client devices 102 associated with the respective users. Such user location data is in some example embodiments used to display in a map-based GUI respective locations of a plurality of users who form part of the social network of the requesting user and/or who have provided permission for the requesting user to view their locations. Each such user may be represented on a map forming part of the map GUI by a respective user icon. Such data can also include privacy indications to indicate which users have access to what location data within a system. For example, certain accounts associated with a first account can be given access to general area based location information without detailed (e.g. street and address level) specific location information, or location information with a status indicator used for combined expressive icons as described below.

Figure 4:
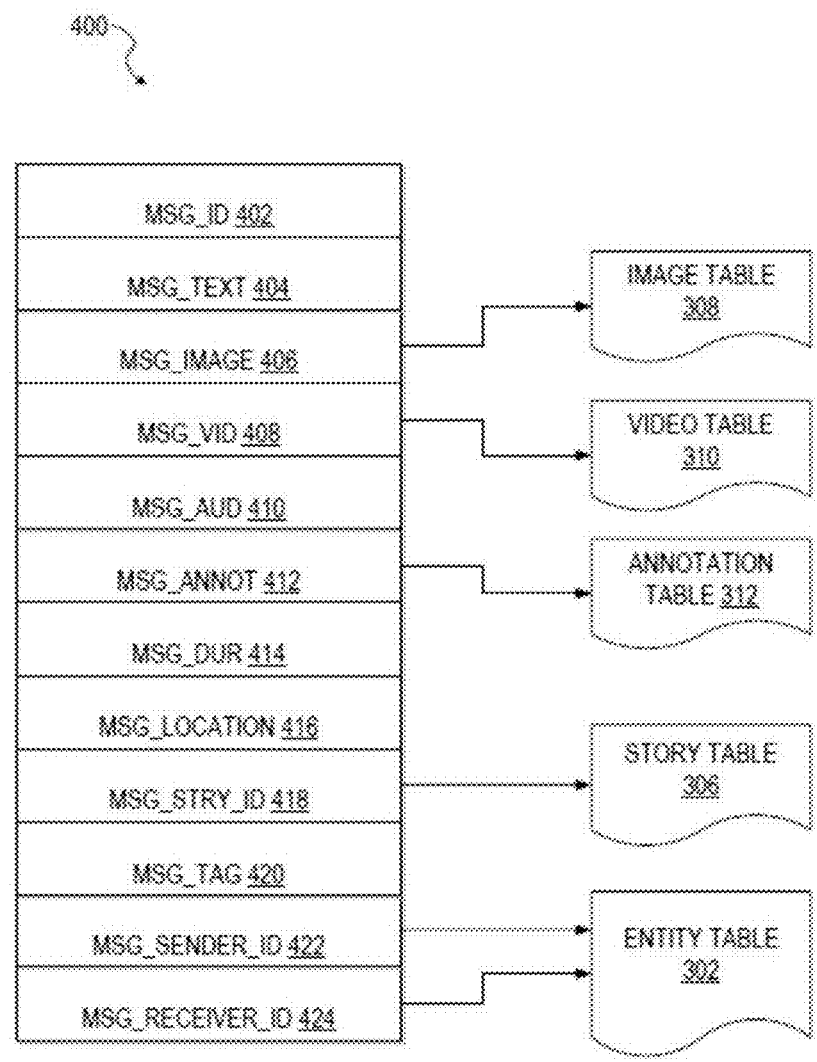
FIG. 4 is a schematic diagram illustrating a structure of a message that can include location information as part of a social media client application according to example embodiments.

FIG. 4 is a schematic diagram illustrating a structure of a social media item or message 400, according to some embodiments, generated by one instance of the social media client application 104 for communication to a further instance of the social media client application 104 or to the social media server application 114. The content of a particular message 400 is used to populate the message table 314 stored within the database 120, accessible by the social media server application 114. Similarly, the content of a message 400 is stored in memory as "in-transit" or "in-flight" data of the client device 102 or the application server 112. The message 400 is shown to include the following components: A message identifier 402: a unique identifier that identifies the message 400. A message text payload 404: text, to be generated by a user via a user interface of the client device 102 and that is included in the message 400. A message image payload 406: image data, captured by a camera component of a client device 102 or retrieved from memory of a client device 102, and that is included in the message 400. A message video payload 408: video data, captured by a camera component or retrieved from a memory component of the client device 102 and that is included in the message 400. A message audio payload 410: audio data, captured by a microphone or retrieved from the memory component of the client device 102, and that is included in the message 400. A message annotation 412: annotation data (e.g., filters, stickers, or other enhancements) that represents annotations to be applied to the message image payload 406, message video payload 408, or message audio payload 410 of the message 400. A display duration parameter 414: a parameter value indicating, in seconds, the amount of time for which content of the message (e.g., the message image payload 406, message video payload 408, and message audio payload 410) is to be presented or made accessible to a user via the social media client application 104. The display duration parameter 414 is also referred to herein as a "display duration timer." A message geolocation parameter 416: geolocation data or geo-tag data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values. An example of such a message story identifier 418 can in some embodiments comprise one or more thumbnail images.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotation 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
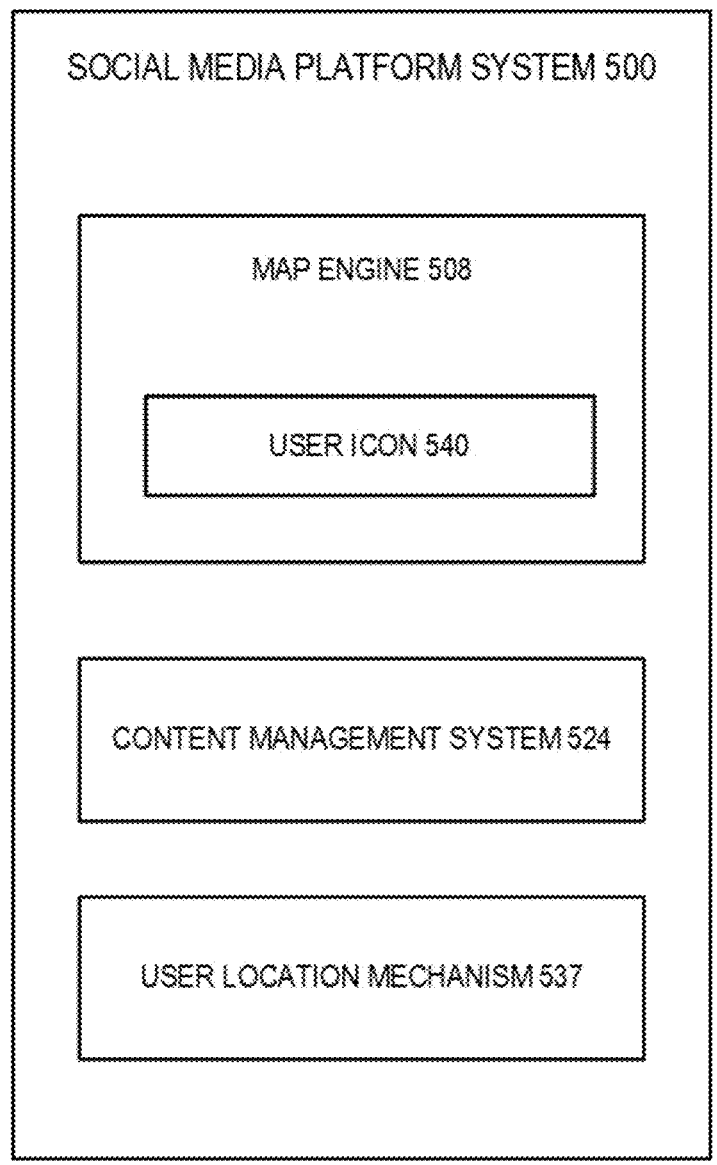
FIG. 5 illustrates aspects of a social media platform for managing a user map interface and icon display settings in accordance with some embodiments.

FIG. 5 shows an example embodiment of a social media platform system 500 configured to provide a map-based graphical user interface for a social media application, such as the map GUI 700 and the map GUI 612 described below. The system 500 and its associated components can in some embodiments be provided server-side, for example by the social media application server system 108 (FIG. 1). In such instances, the respective components of the system 500 can be provided by execution of the social media server application 114 on the application server 112. In other embodiments, one or more components of the system 500 are provided client-side, for example by execution of the social media client application 104 on a respective client device 102 (FIG. 1). In yet further embodiments, the system 500 is provided collaboratively server-side and client-side, the application server 112 and a client device 102 in communication therewith being configured to provide the respective system components by execution of the social media client application 104 on the client device 102 and by execution of the social media server application 114 on the application server 112.

The system 500 includes a map engine 508 to generate a map GUI, including the location-based social media information displayed in the map GUI. Thus, the map engine 508 is configured to generate or to facilitate generation of the map 618 in the map viewport 621 (e.g. an area of a display for map presentation) of the client device 102. To this end, the map engine 508 can be configured with a user icon system 540 to surface and cause display of particular icons and to identify and cause display of respective icons such as friend expressive icons (e.g. friend expressive icon 640 or the friend icons of FIGS. 6-8), to generate map information.

As part of the operation of map engine 508, the icons used to identify positions of devices associated with friend accounts can be generated and provided to a device for inclusion in a map-based GUI. Such a system can be used to provide complex information about a user status by combining an expressive icon (e.g. a flattened two dimensional representation of a user that can include a representation of a user's face and an associated facial expression) with a status indicator (e.g. expressing availability for contact, a do not disturb indication, an activity indication, notification of a future activity, or other complex status information). For example, two different expressive icons (e.g. one expressing sadness and another expressing excitement) combined with the same status indication can convey complex information about a user that would not be possible without both types of information. The use of an expressive icon with a status indicator via user icon system 540 thus enables complex information to be communicated in an efficient manner within a map-based GUI. This information can be conveyed for multiple different users within the same compact space, with the amount of information limited by the size of a device screen and the sizes of the user's combined icons The map engine 508 can, based on user privacy and location sharing selections, place friend icons on a map based on the location information. Such icons can provide complex details about users within a map interface, as well as enabling customized actions based on the particular combination of expressive icon and status indicator for each user. Additional details on such actions are described below, and can include access to identifier and the time associated with the location data (e.g. how many minutes it has been since the location data was collected), the icon display, details about group interactions with the friend account, links to other interfaces (e.g. chat, content collection, shared gallery photos, etc.) relevant to the friend account associated with the friend icon, or other such actions.

The system 500 also includes a content management system (CMS) 524. In this example embodiment, the CMS 524 provides an administration interface enabling operators to manage content, for example by defining various attributes of different place and/or event stories. The CMS 524 in this example embodiment can include the collection management system 204 of FIG. 2 as previously described. The CMS 524 is configured for the automated or semiautomated compilation of the respective social media galleries or content collections (e.g. stories) as previously described. This can include interface or inclusion of curation or moderation tools along with the server-side curation interface 208.

The system 500 further includes a user location mechanism 537 configured to determine respective user locations, in this example embodiment indicated by the respective device locations, to determine for each user the particular friend users who are viewable via the map GUI, and to provide for display of associated user icons at corresponding display locations. The user location mechanism 537 in some embodiments comprises, as part of the server system 108, a user location datastore and an per-user access control list (ACL) that lists the particular friend users viewable by each user. In some embodiments, the per-user ACL specifies respective viewing level granularity for each viewable user. The user location mechanism 537 in such example embodiments is additionally configured to determine and manage respective user display granularity. This includes calculating non-precise display locations for some users, and causing display of a corresponding user icons at the non-precise display locations.

FIGS. 6A, 6B, 6C, and 6D are respective schematic views of a client device providing a map-based graphical user interface for a social media application, according to different respective example embodiments.

Figure 6A:
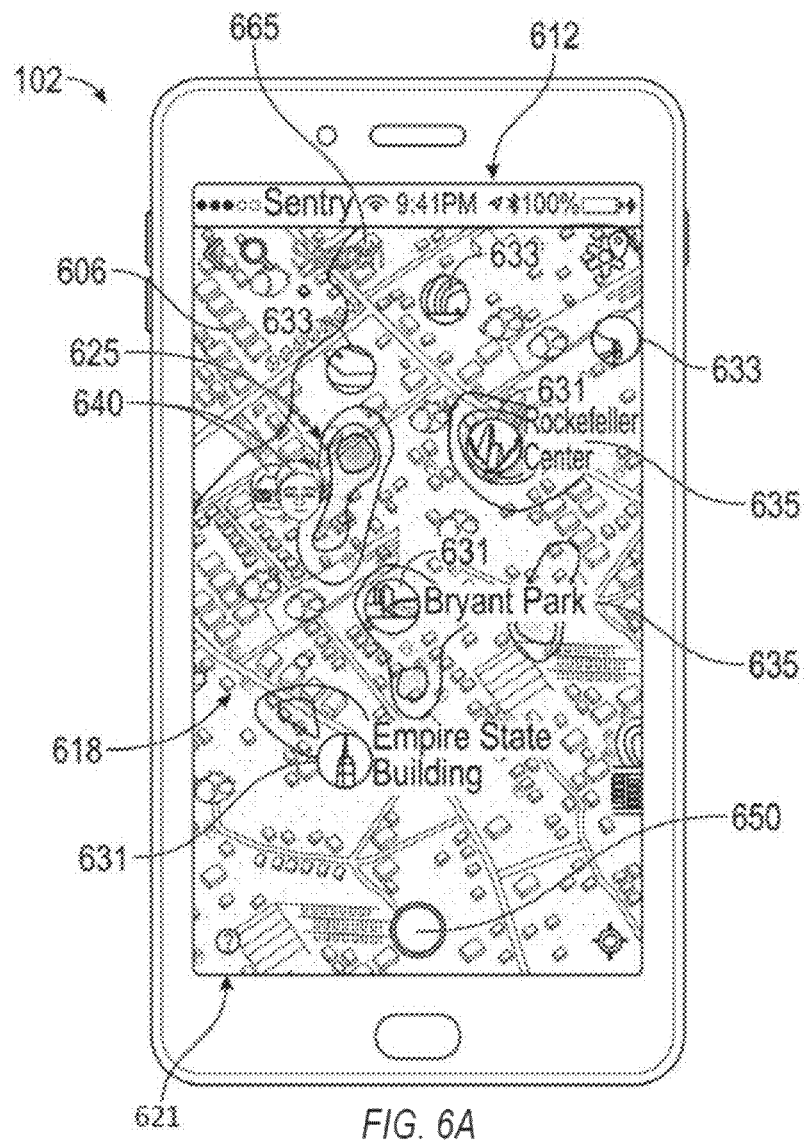
FIGS. 6A, 6B, 6C, and 6D are respective schematic views of a client device providing a map-based graphical user interface for a social media application, according to different respective example embodiments.
Figure 6B:
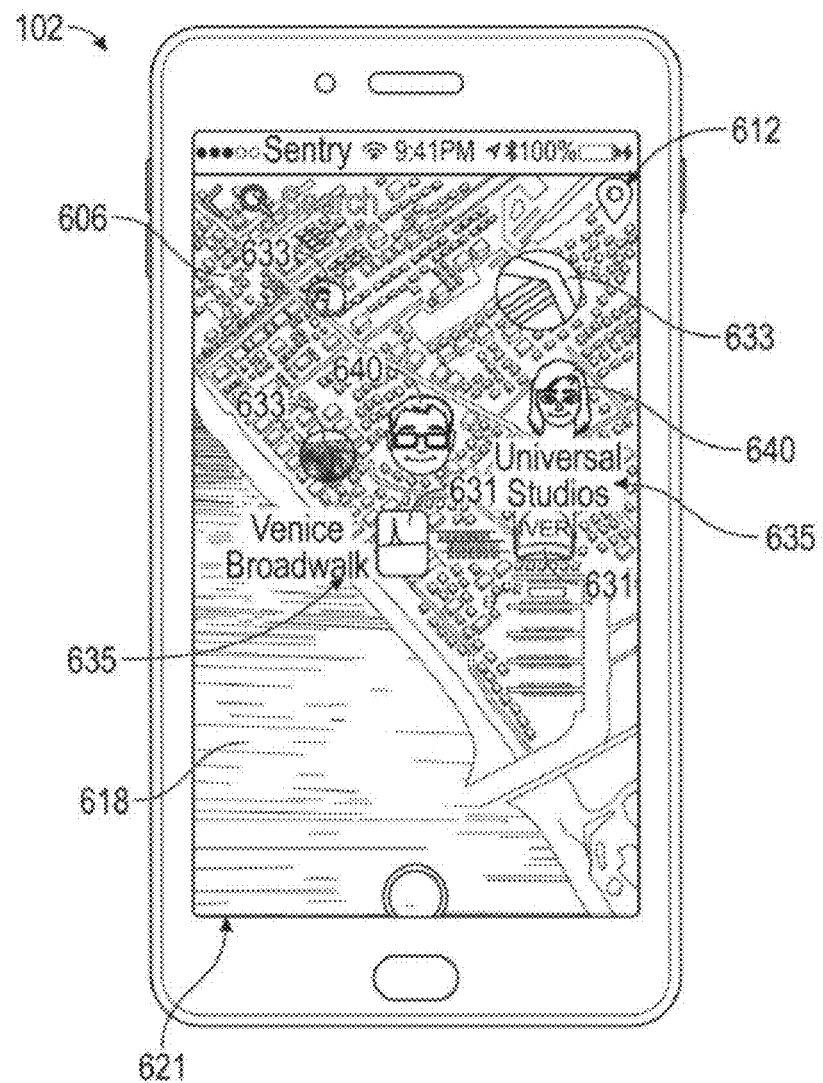

FIG. 6A shows an example embodiment of a map-based graphical user interface, further referred to as a map GUI 612, displayed on a client device 102 in the example form of a mobile phone. In this example embodiment, the map GUI 612 is generated on a display in the form of a touchscreen 606 capable of receiving haptic input. The map GUI 612 includes an interactive map 618 showing a stylized aerial or satellite representation of a particular geographical area. The map 618 is displayed within a map viewport 621 which, in this example embodiment, uses the full available area of the touchscreen 606. In other example embodiments, the map viewport 621 may be a bounded panel or window within a larger display screen. The map GUI 612 further comprises a plurality of user-selectable graphical user interface elements displayed at specific respective geographic locations on the map 618. Each such geo-anchored GUI element is in this example embodiment represented by a respective indicium or icon overlaid on the map 618. The different types of icons and their respective functionalities will be described in greater detail below. As will also be described briefly, the map GUI 612 may further include one or more informational overlays rendered over the underlying geographical map 618, in this example embodiment including a map 625 representative of the geographical distribution of underlying social media activity on the social media platform provided by the relevant social media application.

As mentioned, the map GUI 612 includes a number of different user-selectable icons or UI elements that indicate different geographically based content or information. In this example embodiment, the map GUI 612 includes a plurality of different gallery icons, also referred to in this description as "story icons." Each story icon corresponds in location on the map 618 to a respective location-based social media gallery or collection.

In the example embodiment of FIG. 6A, the map GUI 612 includes two different types of gallery icons for two different respective types of location-based social media galleries, namely place icons 631 for place galleries/stories, and spike icons 633 for spike galleries/stories that are dynamically surfaced on the map GUI 612 based on one or more metrics of underlying social media activity relating to the submission of social media content to the social media platform with geo-tag data indicating the respectively associated geographical areas. Note that these different types of galleries are represented by different types of icons 631, 633. The differences between these different types of galleries and the corresponding visually distinct gallery icons 631, 633 are discussed later herein. The map GUI 612 in this example embodiment further includes friend icons in the example form of expressive icons 640 that are displayed on the map GUI 612 based on the current or last known geographic location of respective friends of the user associated with the client device 102.

In this example embodiment, the social media items that are selectively playable by selection of the corresponding story icons 631, 633 in the map GUI 612 are ephemeral social media items or messages. As described previously, ephemeral content is social media content (e.g., augmented and/or unaugmented video clips, pictures, and/or other messages) that is available for viewing by social media users via the map GUI 612 for only a predetermined limited period, also referred to herein as a respective gallery participation parameter or timer. After expiry of a respective gallery participation parameter or timer for any ephemeral message or content uploaded by a particular user, that ephemeral message or content is no longer available for viewing by other users via the map GUI 612 generated on their respective client devices 102.

As mentioned previously, the map GUI includes a graphical representation of associated locations of the user associated with the client device 102 and/or other users (e.g. friend devices or devices for associated accounts visible through location data of a social media platform), each user being represented by a respective user icon or friend icon (for users who are members of an in-application social graph associated with the viewing user), in the illustrated embodiments being in the form of respective expressive icons 640. In this example embodiment, a user of the social media platform will not be sharing their location if they have never interacted with the map GUI 612. The first time the user interacts with the map GUI 612, the user is taken through an on-boarding flow which allows for the setting of individual location sharing preferences.

As mentioned, a user can also select different groups of other users to via the location sharing preferences interface as friend accounts for location sharing. In some embodiments the user can specify different display attributes for the different respective groups or for different respective individuals, as well as selecting an icon to represent the user in maps of friend accounts.

If all friend accounts are selected for location sharing, all new people added to the user's friends list will automatically be able to see their location, consistent with the granularity level selected by the user in system settings.

When viewing the map GUI, the user will thus be able to see the locations of all his/her friends that have shared their location with him/her on the map 618. As discussed, each user is in this example embodiment represented by an expressive icon 640. If the friend does not have an expressive icon 640, a profile picture within a generic UI element is shown. If no profile pictures available for a particular friend, a default icon (e.g., a blank profile) is displayed at the corresponding location.

In use, the map GUI 612 thus surfaces different types of location-based stories, which the user can view from the map 618. In the example embodiment of FIGS. 6A and 6B, the user can access via the map GUI 612 content posted from anywhere in the world. This can be achieved by navigating to different geographical areas displayed within the map viewport 621. In particular, the displayed geographical area can be changed by zooming in or zooming out, and by moving the focus area of the map viewport 621. In the example embodiment of FIGS. 6A and 6B, in which the map GUI 612 is provided on a touchscreen 606, zooming in and zooming out can be achieved by haptic gestures in the form of a pinch-out or a pinch-in haptic input. Movement of the map 618 within the map viewport 621, so as to change the displayed geographical area, is achieved by a haptic dragging gesture at any point on the map 618.

In this example embodiment, the map 618 is not selectively rotatable by the user, having a fixed default orientation relative to the touchscreen 606. In other embodiments, the map 618 may have a fixed orientation relative to the Earth. In some embodiments, the map 618 is selectively rotatable, e.g., with all map content rotating around a fixed anchor.

As discussed at length above, in any particular map viewport 621, the displayed information can include:

- the color-coded map 625, visually displaying the geographical distribution of content uploading activity within a preceding window (for example the default ephemeral content element lifetime for a content collection can be, in this example 24 hours), allowing the user readily to identify places with more or less activity. This enables the user more effectively to target location-based searches via the map GUI 612. In some embodiments, the color-coded map 625 is shown only at a highest level of magnification. In this example embodiment, however, the color-coded map 625 is rendered at all zoom levels.
- Thumbnail icons 631, 633 for surfaced content forming part of ephemeral galleries or stories. As described previously, these include in this example embodiment place icons 631 for geo-anchored stories associated with particular labeled locations, and spike icons 633 for location-based stories surfaced based on anomalous levels of geo-spatial activity.
- Friend expressive icons 640 of friend users most frequently contacted by the user who is logged in to the social media client application 104 executing on the client device 102 and by which the map GUI 612 is generated. In some embodiments, no spike icons 633 are shown at some levels of magnification. In a particular example embodiment, no spike icons 633 are shown at the original zoom level at which the map GUI 612 loads by default. In such an example, only the map 625, friend expressive icons 640, and a number of place icons 631 are displayed on the map 618 at the original zoom level. As the user zooms in, spike icons 633 are surfaced, representing respective clusters of activity.

It will be appreciated that different icons 631, 633 are surfaced at different zoom levels. In this example embodiment, the map GUI 612 displays no more than a predefined maximum number of place icons 631 and no more than a predefined maximum number of spike icons 633 in any particular view. For example, at any zoom level, the top three place stories (ranked by associated message or content volume) are surfaced by displaying respective place icons 631 in the map viewport 621. Likewise, at any zoom level, the top three spike content collections (ranked by anomaly or unusualness metric value) are surfaced by displaying respective spike icons 633 in the map viewport 621. In other embodiments, any other such surfacing mechanisms can be used for placing icons and associated information in a map GUI.

It will be appreciated that the map GUI 612 is dynamic, in that the information displayed therein changes dynamically with time. New information can be triggered or periodically provided to a system and distributed to client applications 104. The underlying social media items upon which surfacing of the icons 631, 633 and generation of the map 625 is based can further continually change due to the expiration of the availability data associated with the icons.

Figure 6C:
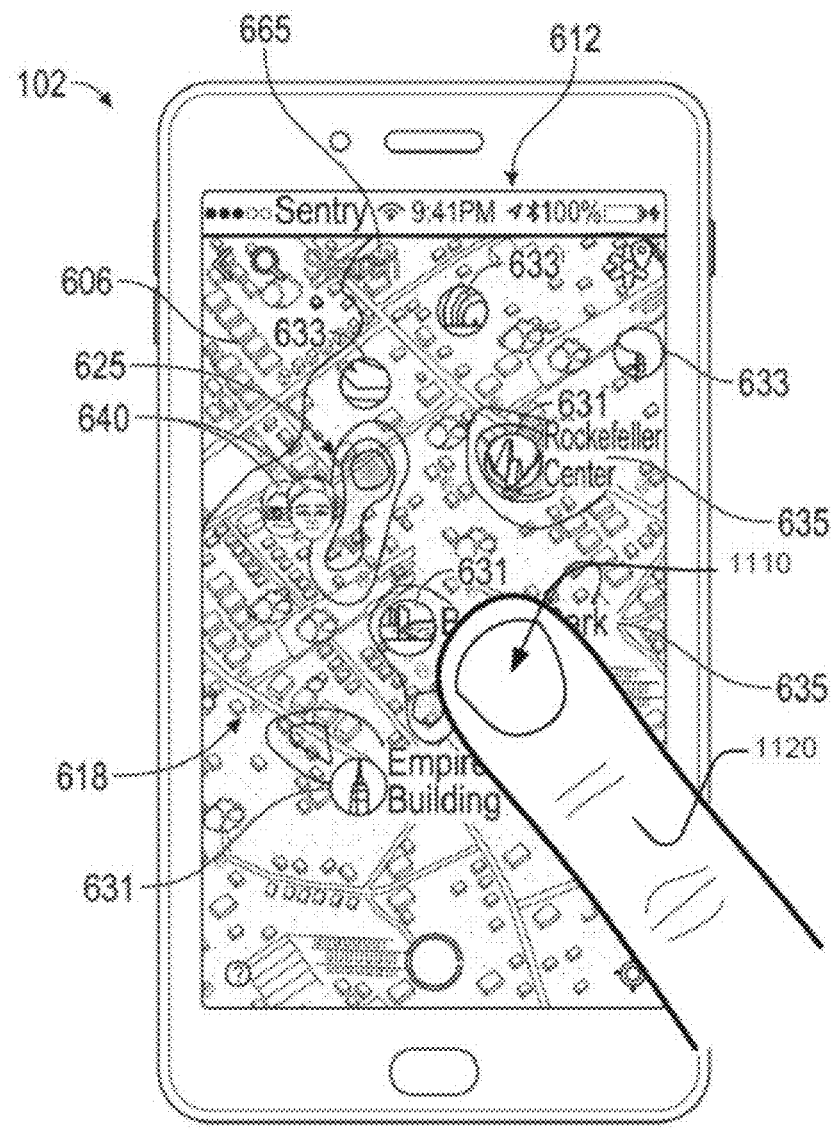
Figure 6D:
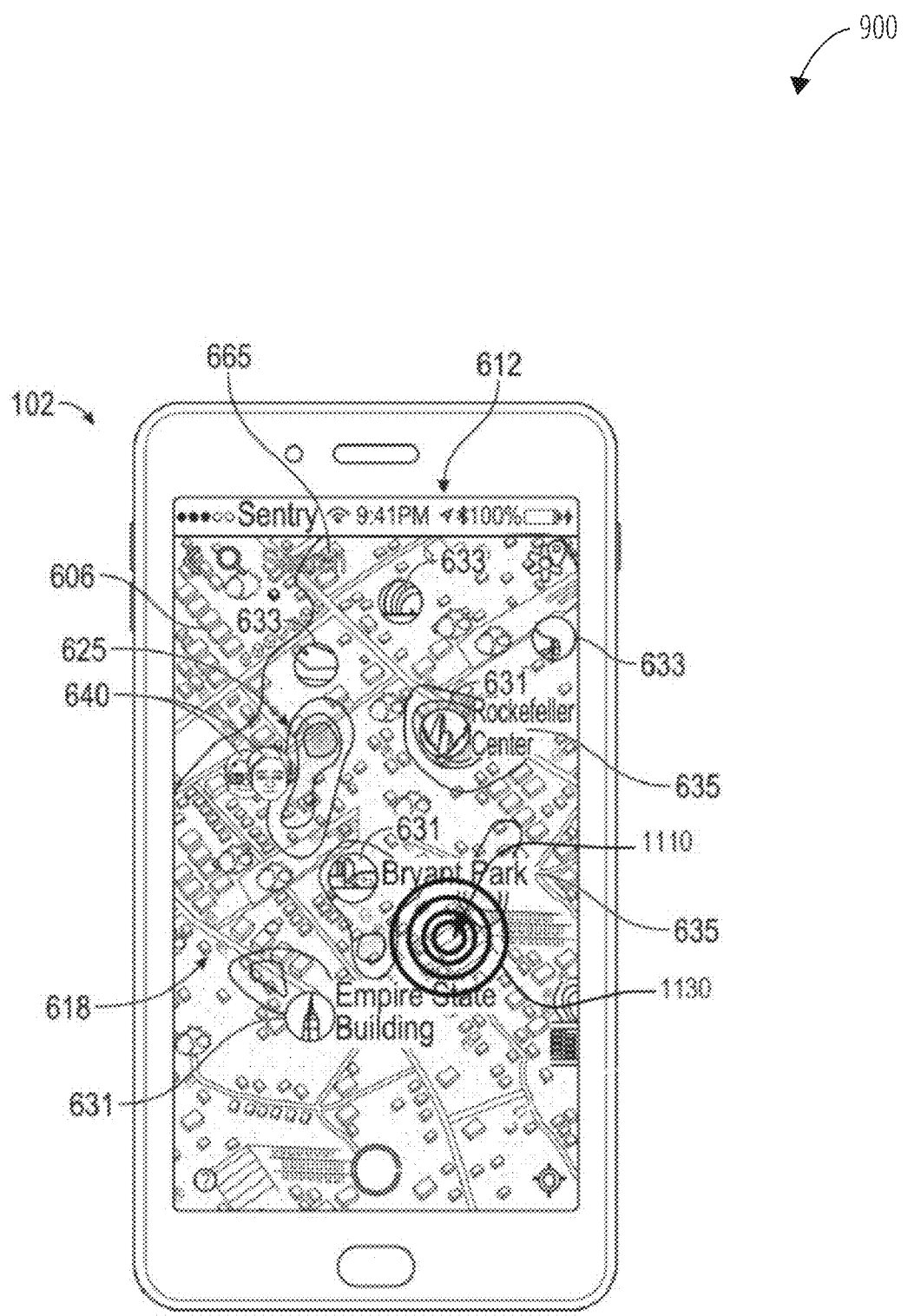

As shown by FIGS. 6C and 6D, a user can pan by touching a display screen at position 696 using a finger 698, and moving the finger to a new position 699 around position 696 in order to pan the map to a new GUI map pan position. This can be set so that the position on the map pans within viewport (e.g. display portions of a display screen of a device) to stay at the position of finger 698, or can be controlled by any other such mechanism in other embodiments.

In some embodiments, the pan input is an action to slide a user finger across a surface of a touchscreen display, as described in FIGS. 6C and 6D. In other embodiments, similar simplified inputs can be used, which limit more complex tap selection operations and improve the efficiency of device operations and user interactions with the device to access friend account data.

Figure 7A:
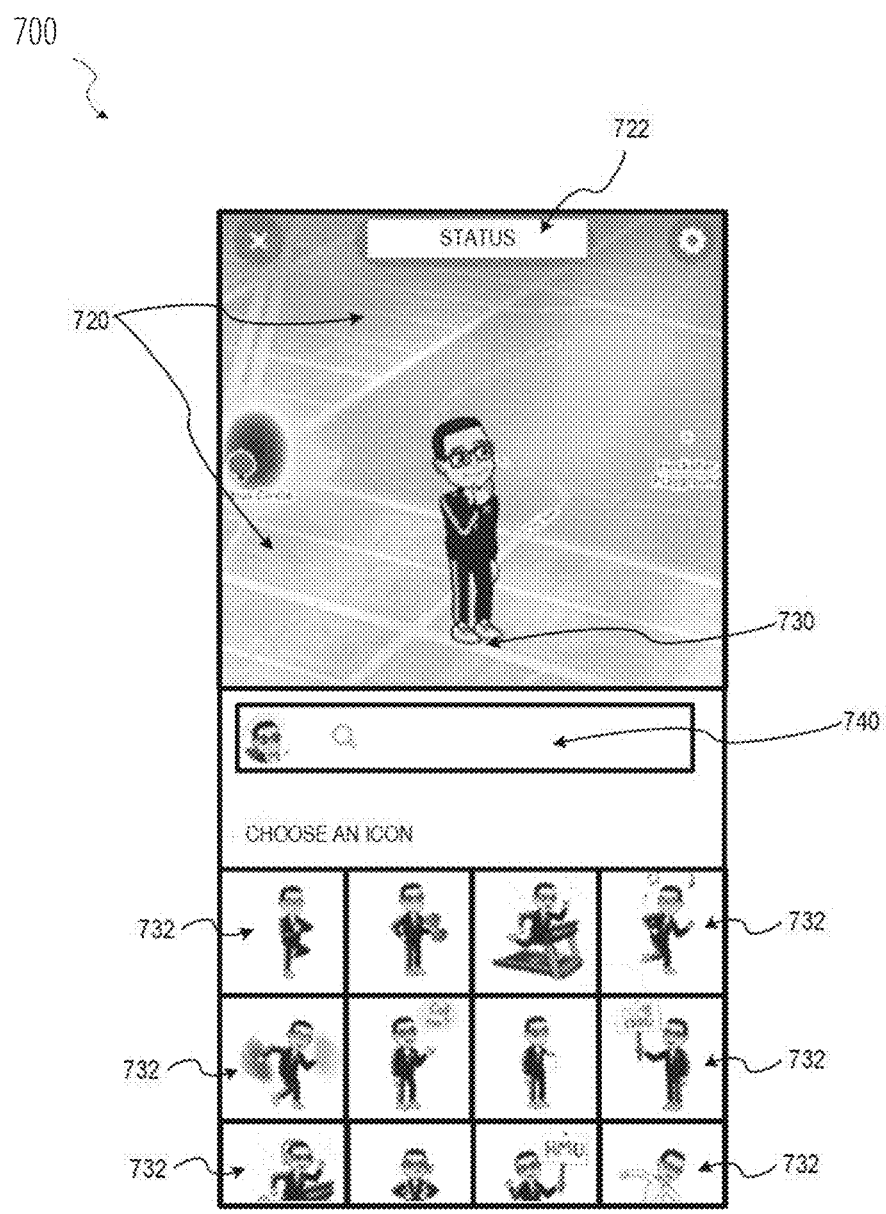
FIGS. 7A-7J are views of a map-based graphical user interface with for generating and displaying combined expressive icons accordance with some example embodiments.
Figure 7B:
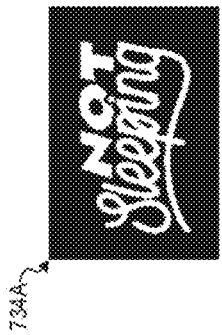
Figure 7C:
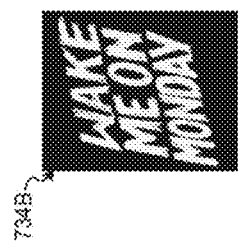
Figure 7D:
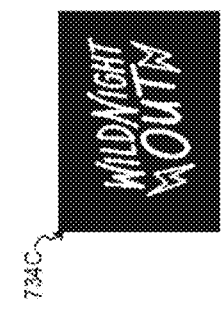
Figure 7E:
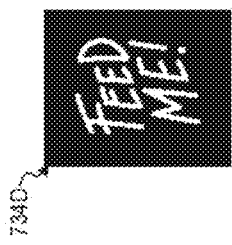
Figure 7F:
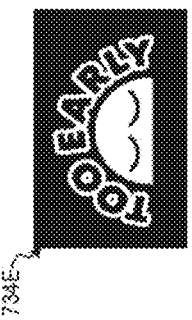
Figure 7G:

FIGS. 7A-J are views of a map-based GUI within a viewport 700 of a device display with icons presented within a defined sub-area of map data 720 for different GUI map pan positions in accordance with some example embodiments. Viewport 700 can be an entire area of a display device of a client device 102 in some embodiments. In other embodiments, viewport 700 is an area of a display designated for map GUI presentation, with other areas designated for other purposes. FIG. 7A illustrates aspects of an interface for selecting an icon within a map based GUI as part of a social networking system. FIG. 7A shows a map based GUI within a viewport 700 of a device that includes map data 720, status information 722, search input 740, and additional map based GUI information. As described above, a social media platform system 100 can include a map engine 508 with a user icon system 540 to allow a user to select icon information to be displayed as part of a map based GUI within such a system. Expressive icons 732 shown in FIG. 7A are examples of basic icons that can be displayed within such a system. The expressive icons represent a first user in an identifiable form, so that other users associated with the first user can identify the first user's icon in a map based GUI from the selected icon. Additionally, variations on the first users icon 732 provide information about the first user, such as an activity, or aspects of a user's current status as reflected by the particular expression of an icon 732 selected by the first user to represent the first user within the map GUIs of other users. In a GUI displayed in a viewport 700 of a first user's device, the first user can select an expressive icon 732, which is then shown at location 730 within map data 720. This icon is relayed to the devices of other users, so that the expressive icon selected by the first user is displayed in the map GUIs of other devices authorized to see the location of the first user.

In addition to an expressive icon 732, embodiments described herein can automatically generate and display a combined expressive icon that merges an expressive icon 732 with status information (e.g. a sticker or animation illustrating status information) in order to communicate more complex information via a map interface than simply by the expressive icon 732 alone. FIGS. 7B-7F illustrate examples of status indicator information 734 that can be combined with an expressive icon (e.g. icon information) to generate a combined expressive icon for use within a map GUI of a social media platform system. The status indicator information 734 can both directly convey information, and be associated with particular actions when a combined icon generated from the status indicator information is presented within a map based GUI. For example, status indicator information 734 can be associated with a chat action, such that an icon 732 combined with status indicator information 734A generates a combined icon that when selected as part of a map based interface, automatically opens a communication interface for interacting with the user associated with the combined icon. By contrast, status indicator information 734B and 734E can each be associated with an automatic do not disturb message, indicating that the user associated with a combined icon based on status indicator information is not currently responding to messages, but is expected to begin responding as a selected date or time. Similarly, status indicator information 734C, 734D, and 734F can be associated with activities at a particular location. A combined icon from such status indicators can directly initiate actions in a map GUI such as providing directions to a location currently associated with the user, or an expected location at a particular time. Status indicator information 734C can, for example, automatically link to an electronic invitation to an event indicating a start and end time, as well as directions to the event.

Figure 7H:
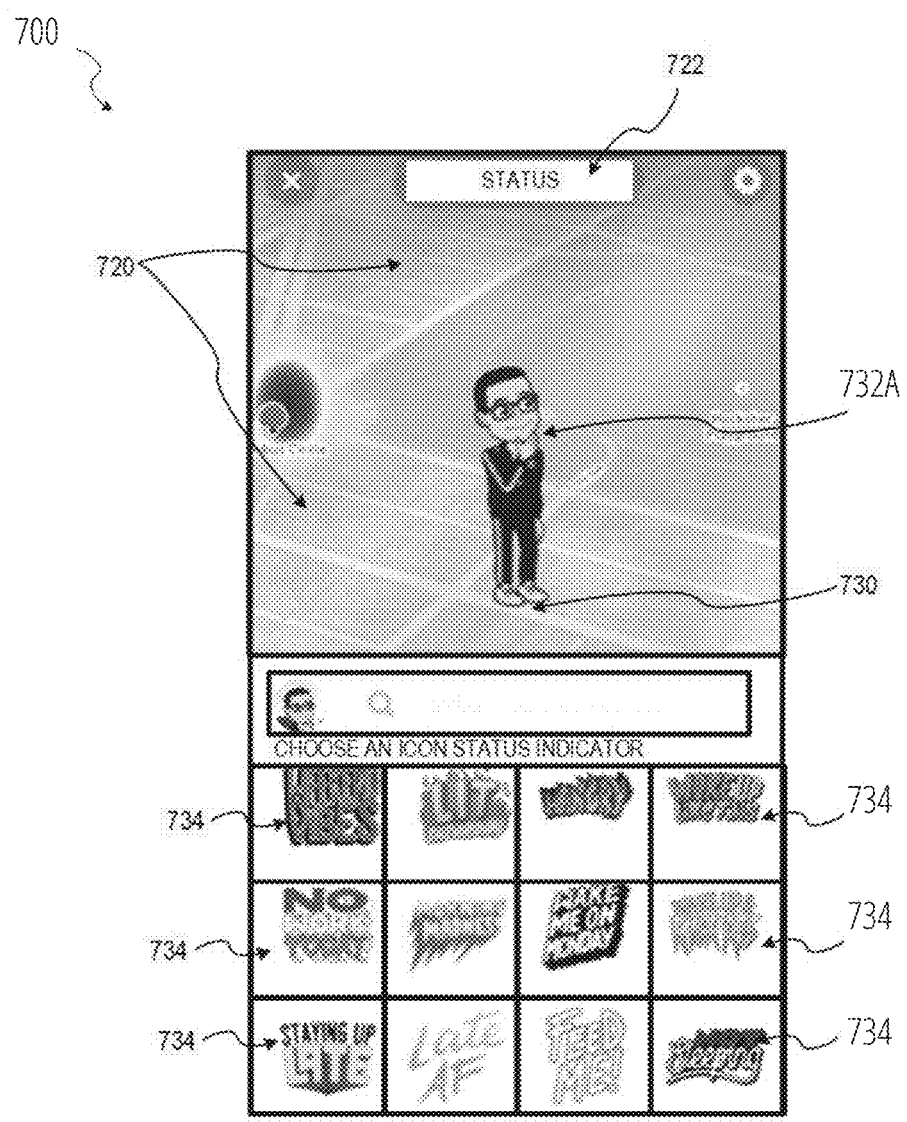

FIG. 7H then illustrates aspects of map based GUI for selecting status indicator information 734 to be merged with a selected expressive icon 732 for a user to generate a combined expressive icon. FIG. 7H can, in some embodiments, illustrate map data 720 with an expressive icon 732 at location 730 for a first user. When a device of a first user receives an input indicating the addition of a status indicator to the expressive icon 732, an interface presenting optional status indicator information 734 options to is presented. The area associated with status indicator information 734 can be scrollable via swipe inputs to display additional options for a selectable status indicator to be merged with expressive icon 732. Each element of status indicator information can be a static sticker graphic, or can be an animation. In some embodiments, status indicator information for a particular status can be both, with various additional information to be used depending on a displaying device's settings. For example, one displaying device can have status animations associated with status indicator information disable, while another can have the animations enabled, so that the same combined expressive icon can be presented in a different form at different client devices depending on the options selected for a particular device. Similarly, different zoom or information densities in a particular display of map data can present a combined expressive icon in different formats. For example, at one density level, only a face can be presented (e.g. icon 640), with the full expressive icon presented as the information density in the map GUI decreases (e.g. expressive icon 732A), and the full combined expressive icon (e.g. combined expressive icon 735) with the expressive icon and the status sticker or animation displayed when this information does not conflict with other map data information in the map GUI.

Figure 7I:
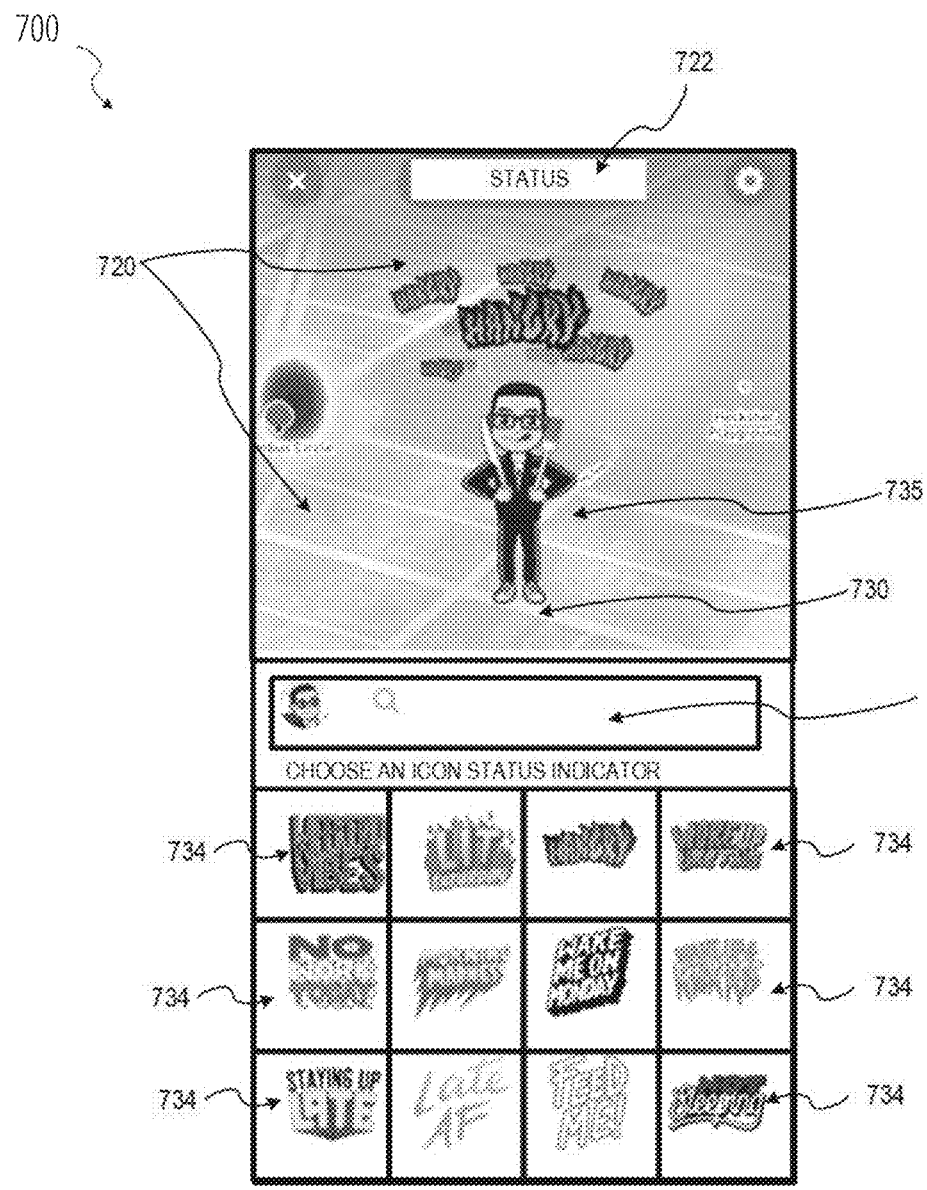

When a particular indicator of status indicator information 734 is selected, then as illustrated in FIG. 7I, the combined expressive icon 735 is available for display in map data 720. In various embodiments, the status information 722 of a device displaying the map data 720 can impact both the display and the selection process in various ways. For example, the expressive icons 732 and the status indicator information 734 presented for selection within viewport 700 can be sorted or modified based on status information 722. For example, if a user device is identified as located in a restaurant, then status information 722 can reflect this, with the expressive icon 732 options for selection sorted to emphasize options reflecting this status. Similarly, status indicator information 734 options presented for selection can also be sorted or filtered to emphasize this status information 722. Additionally, as described above, certain status indicator information 734 can be associated with different actions. When status information 722 identifies a status as at a restaurant, one status indicator information 734 option can be associated with a do not disturb action within a system, while another can be associated with an invitation to join the user at the restaurant before a certain time.

Figure 7J:
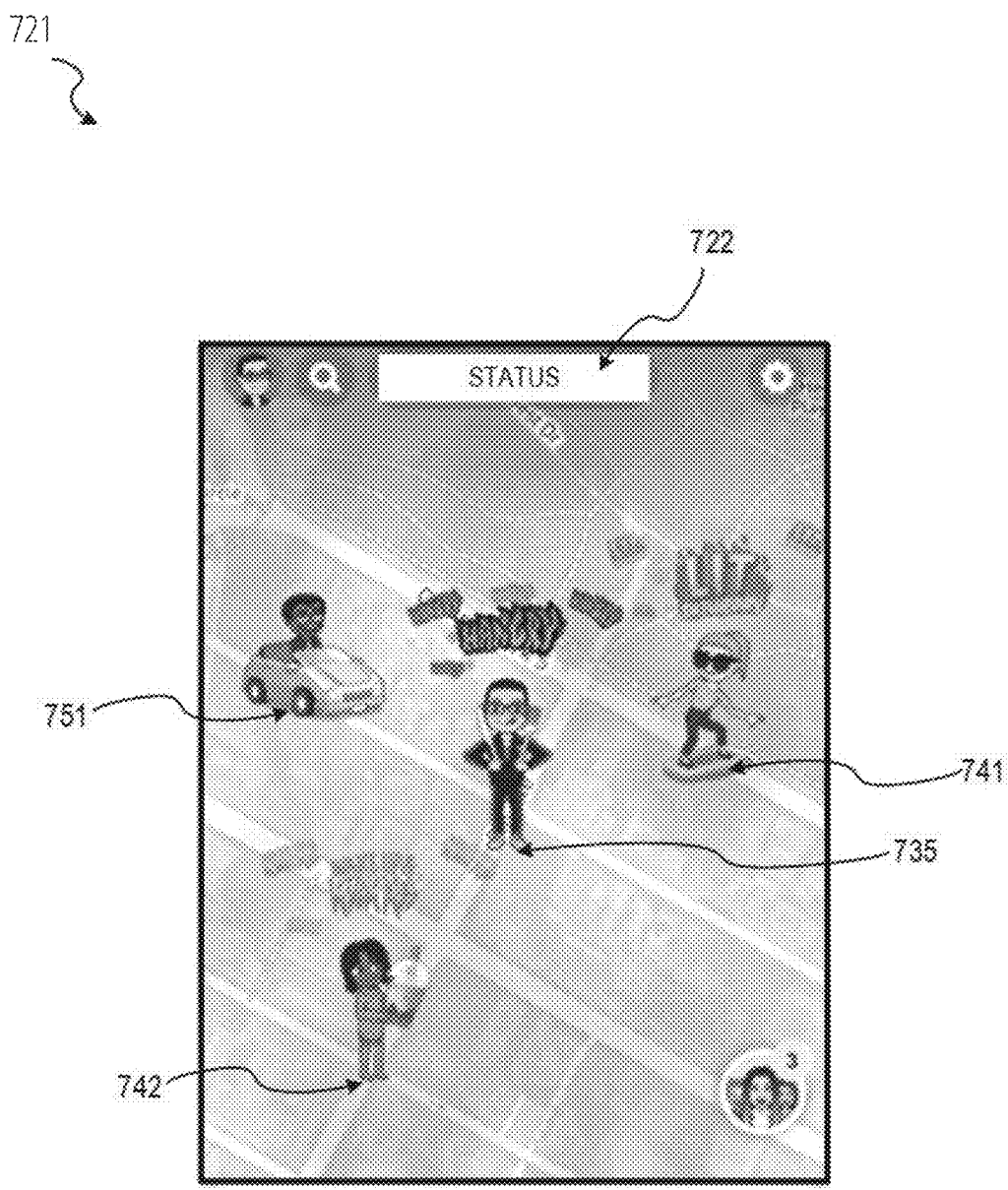

FIG. 7J then illustrates map data 721 which can be presented including icons from various different users a different client devices. Map data 721 includes both background map information, as well as status information 722 for a first account, and icons for other accounts connected with the first account. For example, combined expressive icon 735 for the first account is shown at the center of the screen at a location associated with the device for the first account, and two other combined expressive icons 741 and 742 are also shown at locations associated with devices of accounts connected to the first account. Combined expressive icon 741 includes both an icon representing a user, and status indicator information shown as an animation above the expressive icon to generate combined expressive icon 741 at a position within the map data 721. Icon 751 is an expressive icon without status indicator information. Selection of any of the icons in the map can directly provide a GUI action associated with the icon. For example, selection of icon 751 can provide information about the user account, along with a do not disturb message due to the user driving, and an expected arrival and destination for the account associated with user for icon 751. Selection of combined expressive icon 741 can automatically launch a chat interface with an account associated with icon 741, and selection of combined expressive icon 742 can indicate that a user is having coffee at a particular location until a particular time.

If combined expressive icon 735, which is the icon for an account associated the device displaying map data 721, is selected, options to update the icon or status indicator information can be presented. When this information is updated, operations to update the combined expressive icon locally at the user's device occur, and the updated information can also be communicated to server computers of a server system. The server system can then distribute this information to accounts within the social graph of the initial user that are authorized to have the location and combined icon for the initial user.

In some embodiments, collisions can occur between images and icons associated with different friend accounts displayed in a map GUI. Various embodiments can address such collisions, where images overlap, in different ways. In one embodiment, the images can be allowed to overlap. Priority (e.g. top) placement can be determined by a proximity to a viewport center, a friend account ranking based on recent communications or frequency of communications with the friend accounts whose images are colliding in the map GUI, or other such prioritization mechanisms. In embodiments where significant amounts of information are presented as the additional auto-pop information, such information can be abbreviated or truncated in the case of a collision. In some embodiments, icons and images can be aggregated to form a joint image or joint icon.

Figure 8:
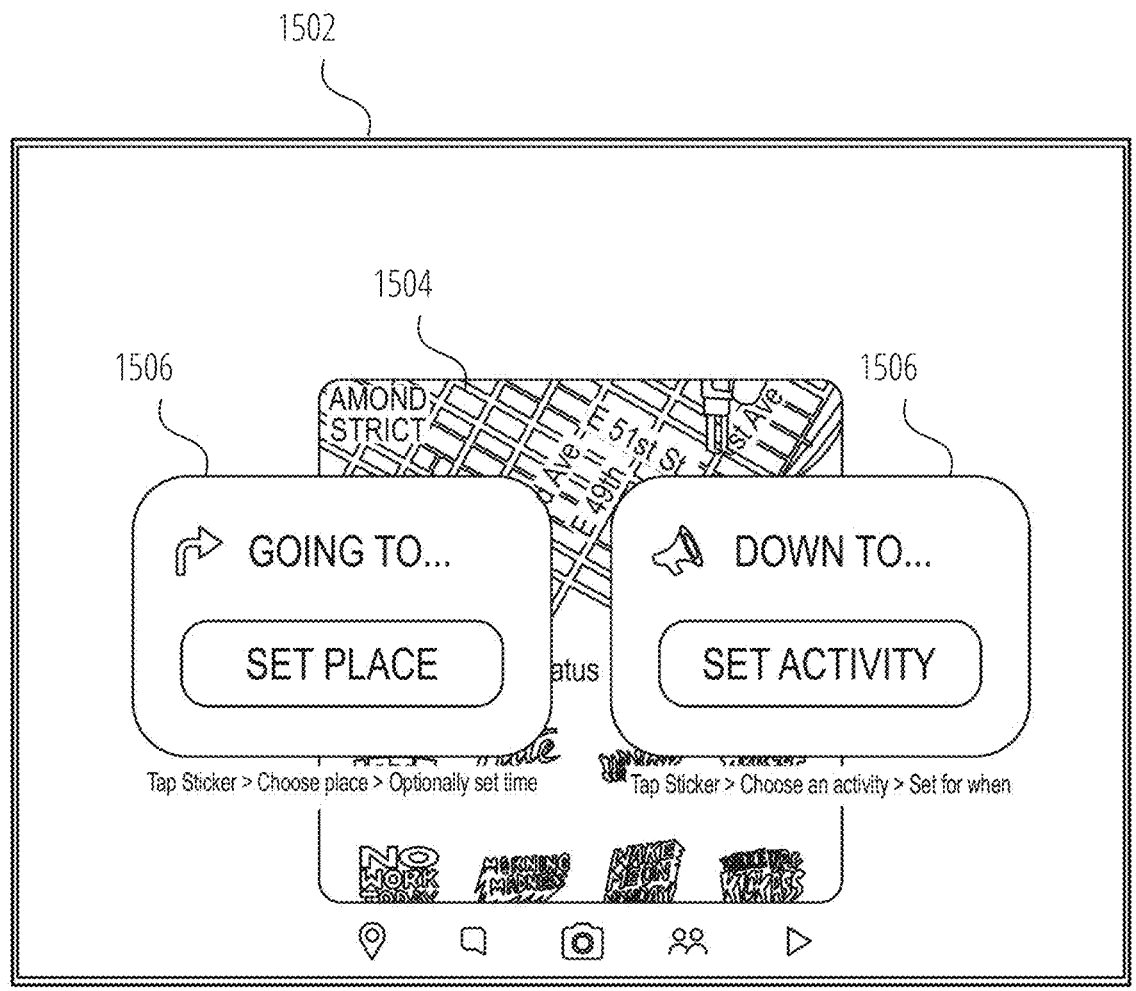
FIG. 8 illustrates aspects of an interface for selecting an icon within a map based GUI as part of a social networking system according to some example embodiments.

FIG. 8 shows a map based GUI within a viewport of a device that includes map data 1504, action indicator information 1506, and additional map based GUI information. As described above, a social media platform system 100 can include a map engine 508 with a user icon system 540 to allow a user to select icon information to be displayed as part of a map-based GUI within such a system.

Figure 9:
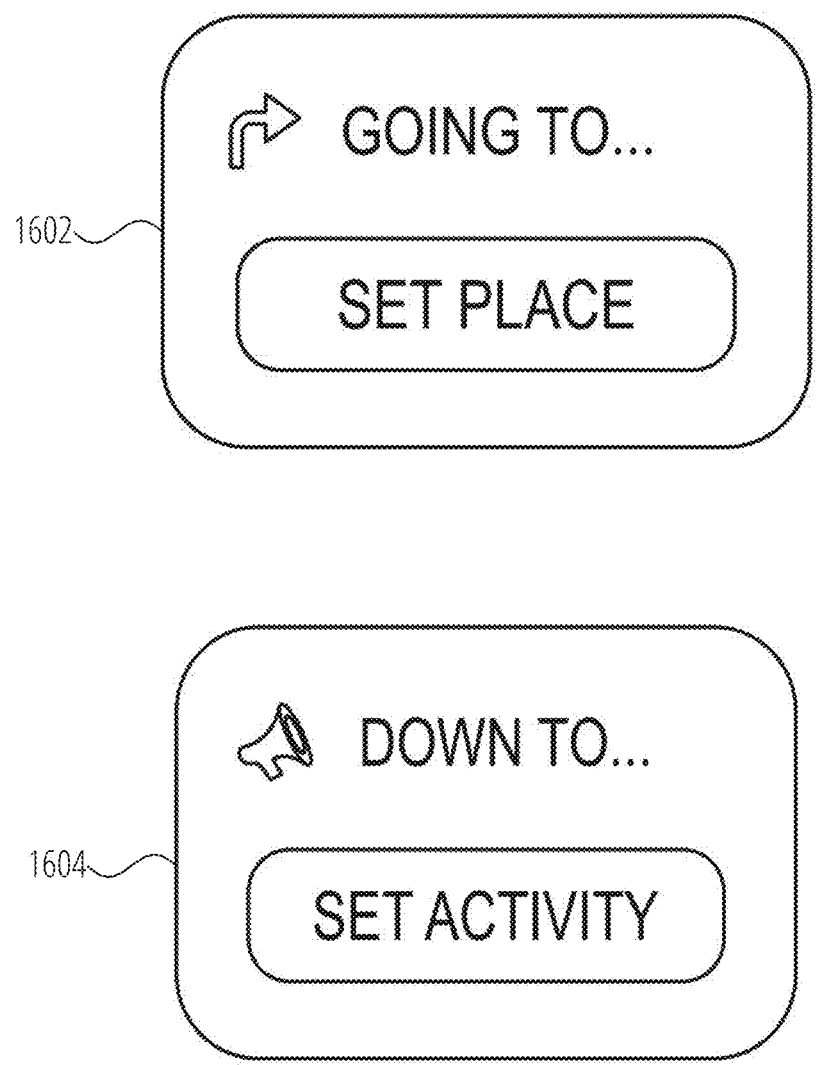
FIG. 9 illustrates aspects of an interface for selecting an icon within a map based GUI as part of a social networking system, according to some example embodiments.

FIG. 9 is an illustration of an action indicator information, according to some example embodiments. In some examples, the action indicator information may indicate a destination indicator 1502. For example, user may select a destination indicator 1502 and input location data relating to a desired destination. The location data relating to a desired destination may be different from the user's current location. In some examples, the action indicator information may indicate an activity indicator 1604. A user may select the activity indicator 1604 and input data relating to a desired activity in which the user wishes to participate in. When a particular indicator of action indicator information is selected, a combined action icon is available for display. The combined action icon includes both an icon representing the user and the action indicator information. In some examples, the combined action icon may include status indicator information. In some examples, the combined action icon may include an expressive icon of the user.

In some examples, a combined action icon may be available for display in map data 720. The combined action icon is relayed to devices of other users, so that the combined action icon is displayed in the map GUIs of other devices authorized to see the location of the user.

In some examples, the action indicator information can be associated with a chat action, such that a user icon combined with action indicator information generates a combined action icon that when selected as part of a map based interface, automatically opens a communication interface for interacting with the user associated with the combined action icon. For example, if a first user is represented on a map based interface with a combined action icon indicating that the first user is going to the mall, a second user authorized to see the location of the first user may be able to select the combined action icon of the first user to chat with the first user via a communication interface. In some examples, upon selection of the combined action icon of the first user, the second user may automatically be provided with directions to the specified mall. In some examples, selection of the combined action icon of the first user may allow a second user to automatically indicate via a second combined action icon for the second user that the second user is also going to the mall with the first user.

The action indicator information may include temporal information indicating a pre-configured time duration. For example, a user may generate a combined action icon upon selection of the destination indicator 1602. The destination indicator 1502 may be associated with a pre-configured time duration of two hours. The pre-configured time duration may be automatically configured based on the location of the user at the time the combined action icon was generated and the desired destination that was received as input upon selection of the destination indicator 1602. For example, if the location data input for the destination indicator 1602 is a mall that is located two hours away from the user's current location, the pre-configured time duration may be automatically configured to two hours. In some examples, the pre-configured time duration may be configured by the user in the form of a user input. Upon exhaustion of the pre-configured time duration, the combined action icon may be replaced by an updated icon. The updated icon may no longer include action indicator information. For example, the updated icon may only include an icon representing the user. In some examples, the updated icon may be a combined expressive icon.

The action indicator information may include temporal information indicating a time frame. For example, the activity indicator 1604 may be associated with a time frame of 2 PM-5 PM. The time frame may be automatically determined based on the activity. In some examples, the time frame may be configured by the user in the form of a user input. For example, a user may generate a combined action icon upon selection of the activity indicator 1604. The combined action icon may indicate the user's desire to play basketball between 2 PM-5 PM. Upon exhaustion of the time frame (e.g., after 5 PM) the combined action icon may be replaced by an updated icon. The updated icon may no longer include action indicator information. For example, the updated icon may only include an icon representing the user. In some examples, temporal information may include only a start time. In some examples, temporal information may include only an end time.

The action indicator information may be a static sticker graphic or may be an animation. In some embodiments, action indicator information for a particular action can be both, with various additional information to be used depending on a displaying device's settings. For example, one displaying device can have action animations associated with action indicator information disabled, while another can have the animations enabled, so that the same combined action icon can be presented in a different form at different client devices depending on the options selected for a particular device. Similarly, different zoom or information densities in a particular display of map data can present a combined action icon in different formats. For example, at one density level, only a face can be presented, with the full combined action icon presented as the information density in the map GUI decreases.

If combined action icon, which is the icon for an account associated the device displaying map data 721, is selected, options to update the icon or status indicator information can be presented. When this information is updated, operations to update the combined action icon locally at the user's device occur, and the updated information can also be communicated to server computers of a server system. The server system can then distribute this information to accounts within the social graph of the initial user that are authorized to have the location and combined icon for the initial user.

Figure 10:
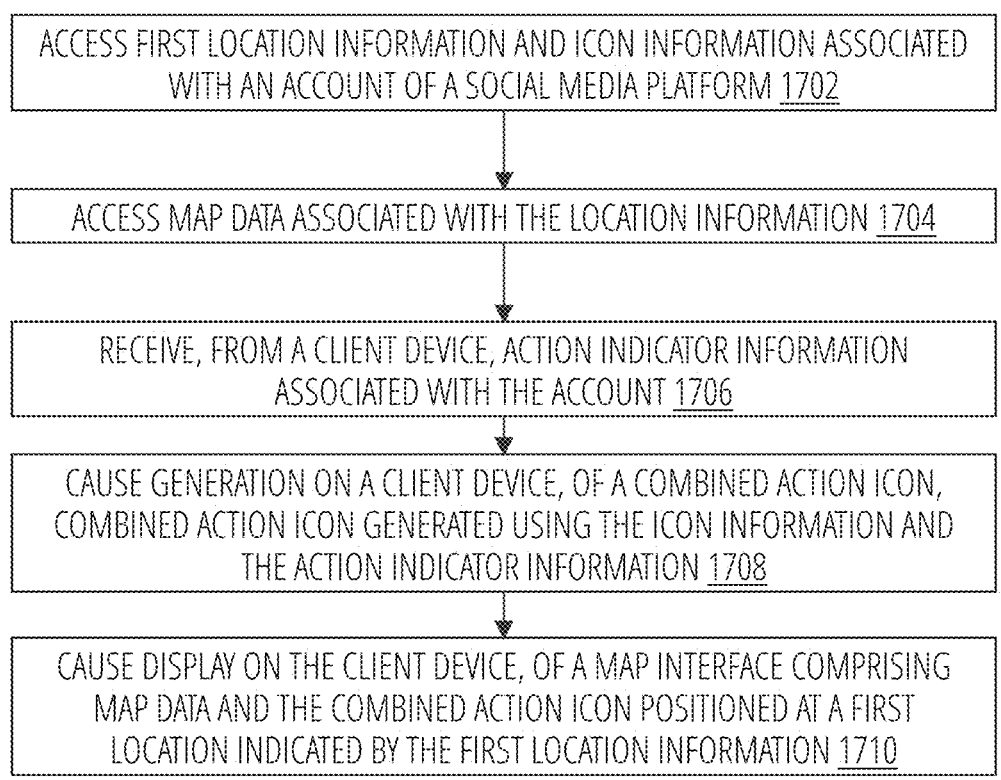
FIG. 10 illustrates a method for generating a combined action icon according to some example embodiments.
Figure 11:
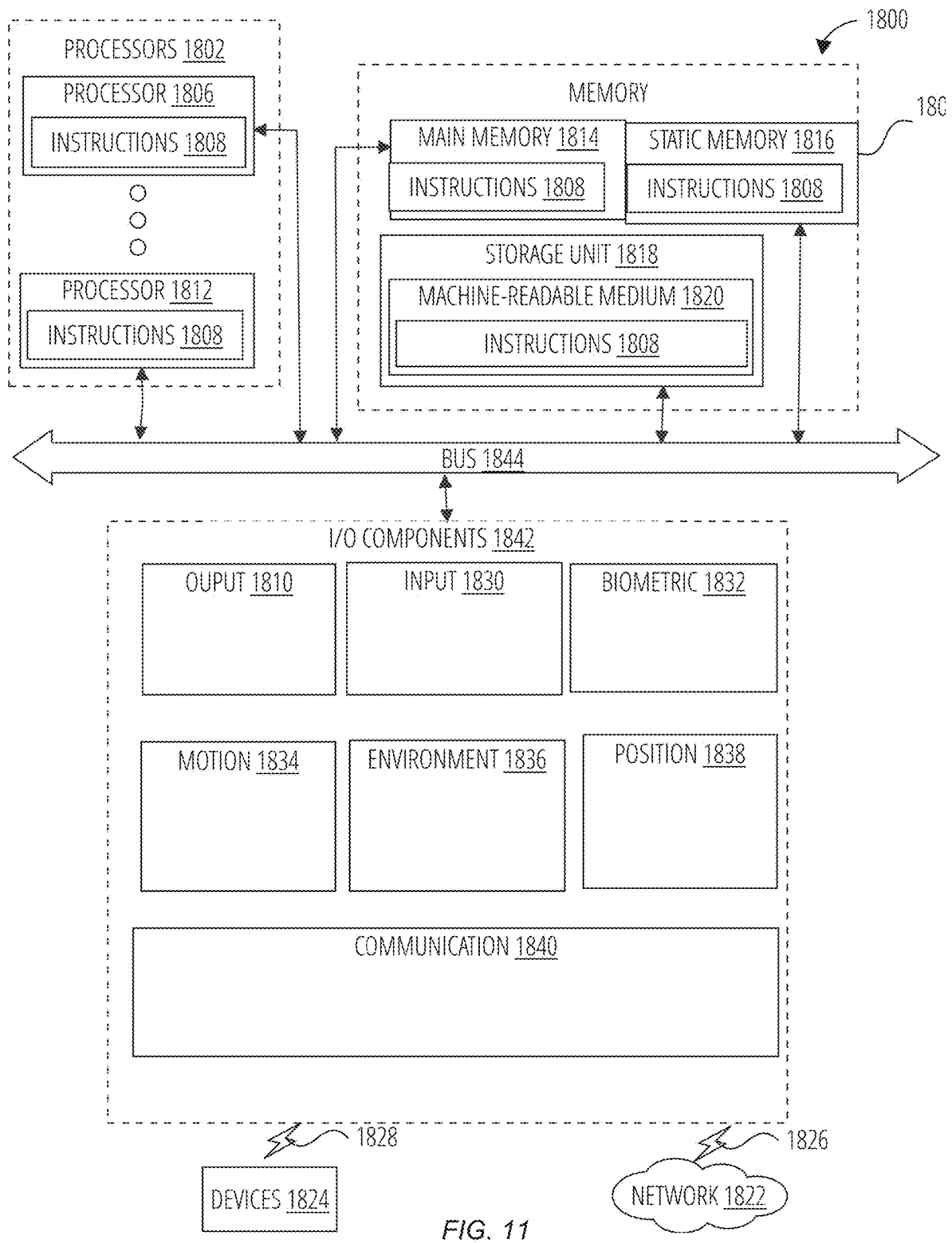
FIG. 11 is a diagrammatic representation of a machine in the form of a computer system within which a set of instructions may be executed for causing the machine to perform any one or more of the methodologies discussed herein, in accordance with some example embodiments.
Figure 12:
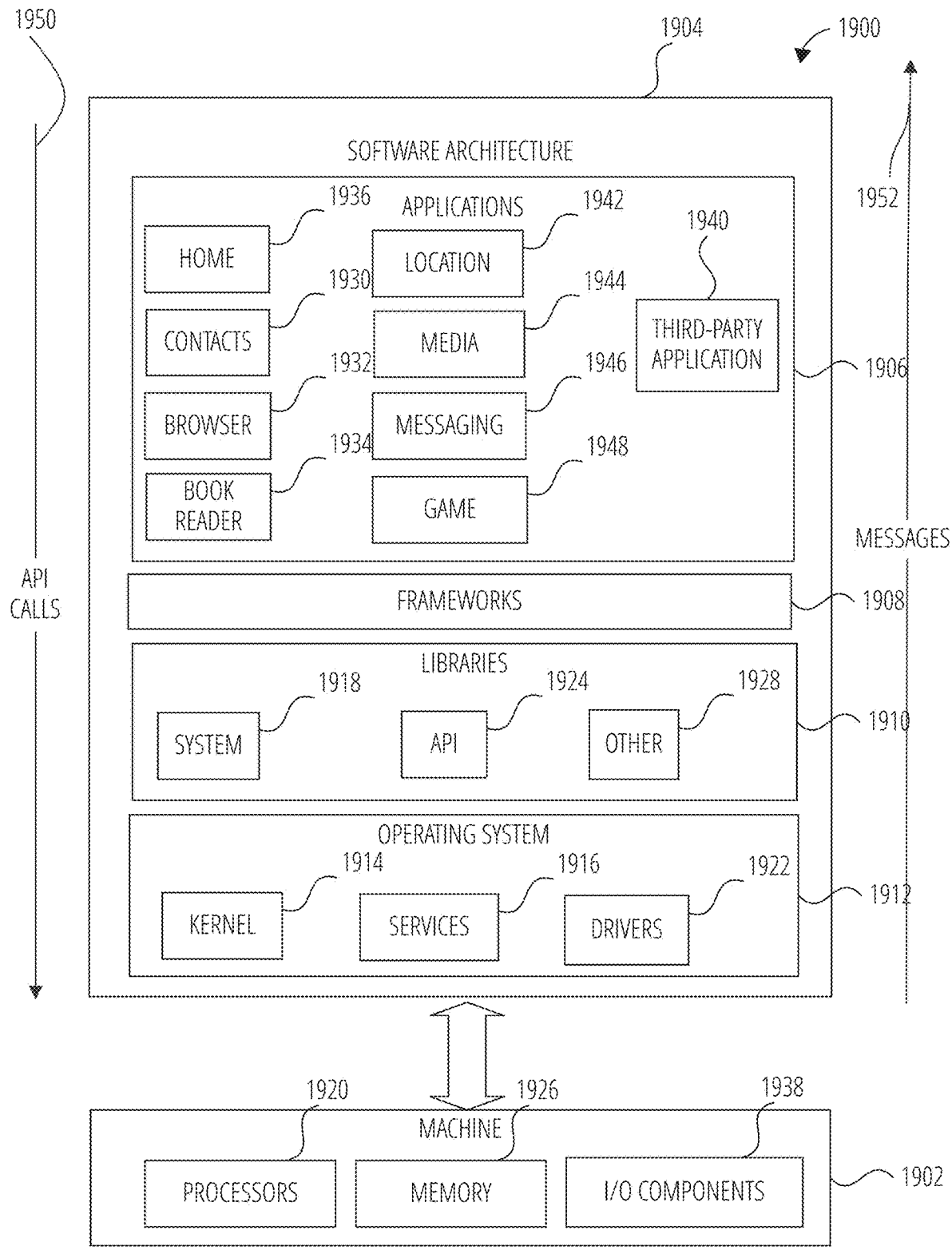
FIG. 12 is block diagram showing a software architecture within which the present disclosure may be implemented, in accordance with some example embodiments.

FIG. 10 is a flowchart describing a method for generating a combined action icon according to some example embodiments. In some embodiments, the method 1712 is performed by a computing device with one or more processors. In some embodiments, the method 1712 is embodied in computer-readable instructions stored in a non-transitory storage device, such that when the instructions are executed by one or more processors of a device, the device performs the method 1712. Other embodiments may be implemented using any acceptable format or instantiation.

Method 1712 begins with operation 1702 accessing, using one or more processors of a computing device, location information and icon information associated with an account of a social media platform. The location information can be generated automatically by location circuitry (e.g. global positioning system circuitry or other location systems) of a client device. The icon information can be selected by a user using a map based GUI as described above. Then operation 1704 involves accessing, by the one or more processors, map data associated with the location information. The map data can be accessed based on the location above, and used to generate map graphics for display in the map GUI with icon information. Operation 1706 involves receiving, from a client device, action indicator information associated with the account of the social media platform. The action indicator information can be selected by a user using a map based GUI as described above.

Operation 1708 involves causing generation on a first client device, of a combined action icon, the combined action icon generated using the icon information and the action indicator information, and operation 1710 involves causing display on the first client device, of a map interface, the map interface comprising the map data and the combined action icon positioned at a location indicated by the location information.

FIG. 18 is a diagrammatic representation of the machine 1800 within which instructions 1808 (e.g., software, a program, an application, an applet, an app, or other executable code) for causing the machine 1800 to perform any one or more of the methodologies discussed herein may be executed. For example, the instructions 1808 may cause the machine 1800 to execute any one or more of the methods described herein. The instructions 1808 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1808, sequentially or otherwise, that specify actions to be taken by the machine 1800. Further, while only a single machine 1800 is illustrated, the term "machine" shall also be taken to include a collection of machines that individually or jointly execute the instructions 1808 to perform any one or more of the methodologies discussed herein.

The machine 1800 may include processors 1802, memory 1804, and I/O components 1842, which may be configured to communicate with each other via a bus 1844. In an example embodiment, the processors 1802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1806 and a processor 1812 that execute the instructions 1808. The term "processor" is intended to include multi-core processors that may comprise two or more independent processors (sometimes referred to as "cores") that may execute instructions contemporaneously. Although FIG. 18 shows multiple processors 1802, the machine 1800 may include a single processor with a single core, a single processor with multiple cores (e.g., a multi-core processor), multiple processors with a single core, multiple processors with multiples cores, or any combination thereof.

The memory 1804 includes a main memory 1814, a static memory 1816, and a storage unit 1818, both accessible to the processors 1802 via the bus 1844. The main memory 1804, the static memory 1816, and storage unit 1818 store the instructions 1808 embodying any one or more of the methodologies or functions described herein. The instructions 1808 may also reside, completely or partially, within the main memory 1814, within the static memory 1816, within machine-readable medium 1820 within the storage unit 1818, within at least one of the processors 1802 (e.g., within the processor's cache memory), or any suitable combination thereof, during execution thereof by the machine 1800.

The I/O components 1842 may include a wide variety of components to receive input, provide output, produce output, transmit information, exchange information, capture measurements, and so on. The specific I/O components 1842 that are included in a particular machine will depend on the type of machine. For example, portable machines such as mobile phones may include a touch input device or other such input mechanisms, while a headless server machine will likely not include such a touch input device. It will be appreciated that the I/O components 1842 may include many other components that are not shown in FIG. 18. In various example embodiments, the I/O components 1842 may include output components 1810 and input components 1830. The output components 1810 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1842 may include biometric components 1832, motion components 1834, environmental components 1836, or position components 1838, among a wide array of other components. For example, the biometric components 1832 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1834 include acceleration sensor components (e.g., accelerometer), gravitation sensor components, rotation sensor components (e.g., gyroscope), and so forth. The environmental components 1836 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1838 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1842 further include communication components 1840 operable to couple the machine 1800 to a network 1822 or devices 1824 via a coupling 1826 and a coupling 1828, respectively. For example, the communication components 1840 may include a network interface component or another suitable device to interface with the network 1822. In further examples, the communication components 1840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1824 may be another machine or any of a wide variety of peripheral devices (e.g., a peripheral device coupled via a USB).

Moreover, the communication components 1840 may detect identifiers or include components operable to detect identifiers. For example, the communication components 1840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1840, such as location via Internet Protocol (IP) geolocation, location via Wi-Fi® signal triangulation, location via detecting an NFC beacon signal that may indicate a particular location, and so forth.

The various memories (e.g., memory 1804, main memory 1814, static memory 1816, and/or memory of the processors 1802) and/or storage unit 1818 may store one or more sets of instructions and data structures (e.g., software) embodying or used by any one or more of the methodologies or functions described herein. These instructions (e.g., the instructions 1808), when executed by processors 1802, cause various operations to implement the disclosed embodiments.

The instructions 1808 may be transmitted or received over the network 1822, using a transmission medium, via a network interface device (e.g., a network interface component included in the communication components 1840) and using any one of a number of well-known transfer protocols (e.g., hypertext transfer protocol (HTTP)). Similarly, the instructions 1808 may be transmitted or received using a transmission medium via the coupling 1828 (e.g., a peer-to-peer coupling) to the devices 1824.

FIG. 19 is a block diagram 1900 illustrating a software architecture 1904, which can be installed on any one or more of the devices described herein. The software architecture 1904 is supported by hardware such as a machine 1902 that includes processors 1920, memory 1926, and I/O components 1938. In this example, the software architecture 1904 can be conceptualized as a stack of layers, where each layer provides a particular functionality. The software architecture 1904 includes layers such as an operating system 1912, libraries 1910, frameworks 1908, and applications 1906. Operationally, the applications 1906 invoke API calls 1950 through the software stack and receive messages 1952 in response to the API calls 1950.

The operating system 1912 manages hardware resources and provides common services. The operating system 1912 includes, for example, a kernel 1914, services 1916, and drivers 1922. The kernel 1914 acts as an abstraction layer between the hardware and the other software layers. For example, the kernel 1914 provides memory management, processor management (e.g., scheduling), component management, networking, and security settings, among other functionality. The services 1916 can provide other common services for the other software layers. The drivers 1922 are responsible for controlling or interfacing with the underlying hardware. For instance, the drivers 1922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1910 provide a low-level common infrastructure used by the applications 1906. The libraries 1910 can include system libraries 1918 (e.g., C standard library) that provide functions such as memory allocation functions, string manipulation functions, mathematic functions, and the like. In addition, the libraries 1910 can include API libraries 1924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1910 can also include a wide variety of other libraries 1928 to provide many other APIs to the applications 1906.

The frameworks 1908 provide a high-level common infrastructure that is used by the applications 1906. For example, the frameworks 1908 provide various graphical user interface (GUI) functions, high-level resource management, and high-level location services. The frameworks 1908 can provide a broad spectrum of other APIs that can be used by the applications 1906, some of which may be specific to a particular operating system or platform.

In an example embodiment, the applications 1906 may include a home application 1936, a contacts application 1930, a browser application 1932, a book reader application 1934, a location application 1942, a media application 1944, a messaging application 1946, a game application 1948, and a broad assortment of other applications such as a third-party application 1940. The e applications 1906 are programs that execute functions defined in the programs. Various programming languages can be employed to create one or more of the applications 1906, structured in a variety of manners, such as object-oriented programming languages (e.g., Objective-C, Java, or C++) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1940 can invoke the API calls 1950 provided by the operating system 1912 to facilitate functionality described herein.

What is claimed is:

1. A method comprising:
   accessing, using one or more processors of a computing device, first location information and first icon information associated with first account of a social media platform and second location information and second icon information associated with a second account of a social media platform, the second location information being proximate to the first location information;
   accessing, by the one or more processors, first map data associated with the first location information and second map data associated with the second location information,
   receiving, from a first client device, first action indicator information associated with the first account;
   receiving, from a second client device, second action indicator information associated with the second account;
   causing generation on the first client device, of a first combined action icon, the first combined action icon generated using the first icon information and the first action indicator information;
   causing generation on the second client device, of a second combined action icon, the second combined action icon generated using the second icon information and the second action indicator information;
   determining that the second account has a higher priority than the first account; and
   based on the determination, causing display on a third client device, of a map interface, the map interface comprising the second map data and the second combined action icon positioned at a second location indicated by the second location information.

2. The method of claim 1, further comprising:
   receiving first temporal information associated with the first action indicator information from the first client device; and
   causing generation of the first combined action icon based on the first temporal information.

3. The method of claim 2, wherein the first temporal information comprises a pre-configured time duration, the method further comprising:
   determining an expiration of the pre-configured time duration; and
   in response to determining the expiration of the pre-configured time duration, causing display of an updated first combined action icon on the map interface.

4. The method of claim 2, wherein the first temporal information comprises a time frame, the method further comprising:
   determining an expiration of the time frame; and
   in response to determining the expiration of the time frame, causing display of an updated first combined action icon on the map interface.

5. The method of claim 1, wherein the fir action indicator information comprises third location information indicating a third location.

6. The method of claim 1, wherein the first combined action icon comprises status indicator information.

7. The method of claim 1, wherein the first action indicator information comprises first activity information.

8. A system comprising:
   a processor; and
   a memory storing instructions that, when executed by the processor, configure the system to perform operations comprising:
   accessing, using one or more processors of a computing device, first location information and first icon information associated with first account of a social media platform and second location information and second icon information associated with a second account of a social media platform, the second location information being proximate to the first location information;

accessing, by the one or more processors, first map data associated with the first location information and second map data associated with the second location information;

receiving, from a first client device, first action indicator information associated with the first account;

receiving, from a second client device, second action indicator information associated with the second account;

causing generation on the first client device, of a first combined action icon, the first combined action icon generated using the first icon information and the first action indicator information;

causing generation on the second client device, of a second combined action icon, the second combined action icon generated using the second icon information and the second action indicator information;

determining that the second account has a higher priority than the first account; and based on the determination, causing display on a third client device, of a map interface, the map interface comprising the second map data and the second combined action icon positioned at a second location indicated by the second location information.

9. The system of claim 8, the operations further comprising:

receiving first temporal information associated with the first action indicator information from the first client device; and causing generation of the first combined action icon based on the first temporal information.

10. The system of claim 9, wherein the first temporal information comprises a pre-configured time duration, the operations further comprising:

determine an expiration of the pre-configured time duration; and in response to determining the expiration of the time frame, causing display of an updated first combined action icon on the map interface.

11. The system of claim 9, wherein the first temporal information comprises a time frame, the operations further comprising:

determine an expiration of the time frame; and in response to determining the expiration of the time frame, causing display of an updated first combined action icon on the map interface.

12. The system of claim 8, wherein the first action indicator information comprises third location information indicating a third location.

13. The system of claim 8, wherein the first combined action icon comprises first status indicator information.

14. The system of claim 8, wherein the first action indicator information comprises first activity information.

15. A non-transitory computer-readable storage medium, the computer-readable storage medium including instructions that when executed by a computer, cause the computer to perform operations comprising:

accessing, using one or more processors of a computing device, first location information and first icon information associated with first account of a social media platform and second location information and second icon information associated with a second account of a social media platform, the second location information being proximate to the first location information;

accessing, by the one or more processors, first map data associated with the first location information and second map data associated with the second location information;

receiving, from a first client device, first action indicator information associated with the first account;

receiving, from a second client device, second action indicator information associated with the second account;

causing generation on the first client device, of a first combined action icon, the first combined action icon generated using the first icon information and the first action indicator information;

causing generation on the second client device, of a second combined action icon, the second combined action icon generated using the second icon information and the second action indicator information;

determining that the second account has a higher priority than the first account; and based on the determination, causing display on a third client device, of a map interface, the map interface comprising the second map data and the second combined action icon positioned at a second location indicated by the second location information.

16. The computer-readable storage medium of claim 15, the operations further comprising:

receiving first temporal information associated with the first action indicator information from the first client device; and causing generation of the first combined action icon based on the first temporal information.

17. The computer-readable storage medium of claim 16, wherein the first temporal information comprises a pre-configured time duration, the operations further comprising:

determine an expiration of the pre-configured time duration; and in response to determining the expiration of the time frame, causing display of an updated first combined action icon on the map interface.

18. The computer-readable storage medium of claim 16, wherein the first temporal information comprises a time frame, the operations further comprising:

determine an expiration of the time frame; and in response to determining the expiration of the time frame, causing display of an updated first combined action icon on the map interface.

19. The computer-readable storage medium of claim 15, wherein the first action indicator information comprises third location information indicating a third location.

20. The computer-readable storage medium of claim 15, wherein the first combined action icon comprises first status indicator information.

* * * * *